(12) United States Patent
Albrecht et al.

(10) Patent No.: US 11,049,644 B2
(45) Date of Patent: Jun. 29, 2021

(54) METHOD FOR PRODUCING A COIL ASSEMBLY, COIL ASSEMBLY, STATOR, AND MULTI-DIMENSIONAL DRIVE

(71) Applicant: Robert Bosch GmbH, Stuttgart (DE)

(72) Inventors: Andreas Albrecht, Esslingen (DE); Stefan Junker, Leonberg (DE); Ilya Kamenshchikov, Kleeve (DE); Stefan Daehling, Aachen (DE); Volker Henrichs, Ludwigsburg (DE); Markus Hanisch, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 523 days.

(21) Appl. No.: 15/773,666

(22) PCT Filed: Oct. 28, 2016

(86) PCT No.: PCT/EP2016/076026
§ 371 (c)(1),
(2) Date: May 4, 2018

(87) PCT Pub. No.: WO2017/076761
PCT Pub. Date: May 11, 2017

(65) Prior Publication Data
US 2018/0323001 A1    Nov. 8, 2018

(30) Foreign Application Priority Data

Nov. 5, 2015  (DE) .................... 10 2015 221 710.8
Mar. 22, 2016 (DE) .................... 10 2016 204 721.3
Oct. 27, 2016 (DE) .................... 10 2016 221 181.1

(51) Int. Cl.
*H02K 3/28* (2006.01)
*H01F 27/28* (2006.01)
(Continued)

(52) U.S. Cl.
CPC .......... *H01F 27/2847* (2013.01); *H02K 3/04* (2013.01); *H02K 3/28* (2013.01); *H02K 41/031* (2013.01);
(Continued)

(58) Field of Classification Search
CPC .......... H02K 3/04; H02K 3/28; H02K 41/031; H01F 27/2847
(Continued)

(56) References Cited

U.S. PATENT DOCUMENTS 4,308,513 A    12/1981  Layton et al.
6,087,922 A *  7/2000  Smith .................... H01F 27/28
                                                    336/223
(Continued)

OTHER PUBLICATIONS

International Search Report corresponding to PCT Application No. PCT/EP2016/076026, dated Feb. 3, 2017 (German and English language document) (7 pages).

*Primary Examiner* — Terrance L Kenerly
(74) *Attorney, Agent, or Firm* — Maginot, Moore & Beck LLP

(57) ABSTRACT

A coil assembly of a stator of a planar multi-dimensional drive includes at least one coil. The at least one coil includes a winding. The winding is electrically conductive and has a winding material. The winding is a structure of the winding material, which is folded at folding points and which has one or more windings.

13 Claims, 30 Drawing Sheets

(51) Int. Cl.
  *H02K 41/03* (2006.01)
  *H02K 3/04* (2006.01)
(52) U.S. Cl.
  CPC .. *H01F 2027/2861* (2013.01); *H02K 2201/18* (2013.01)
(58) Field of Classification Search
  USPC ..................................................... 310/12.21
  See application file for complete search history.

(56) References Cited

U.S. PATENT DOCUMENTS

| | | | |
|---|---|---|---|
| 6,452,292 B1 * | 9/2002 | Binnard | H02K 41/03 310/12.06 |
| 2010/0321664 A1 | 12/2010 | Makarovic et al. | |
| 2014/0285122 A1 | 9/2014 | Lu et al. | |

* cited by examiner

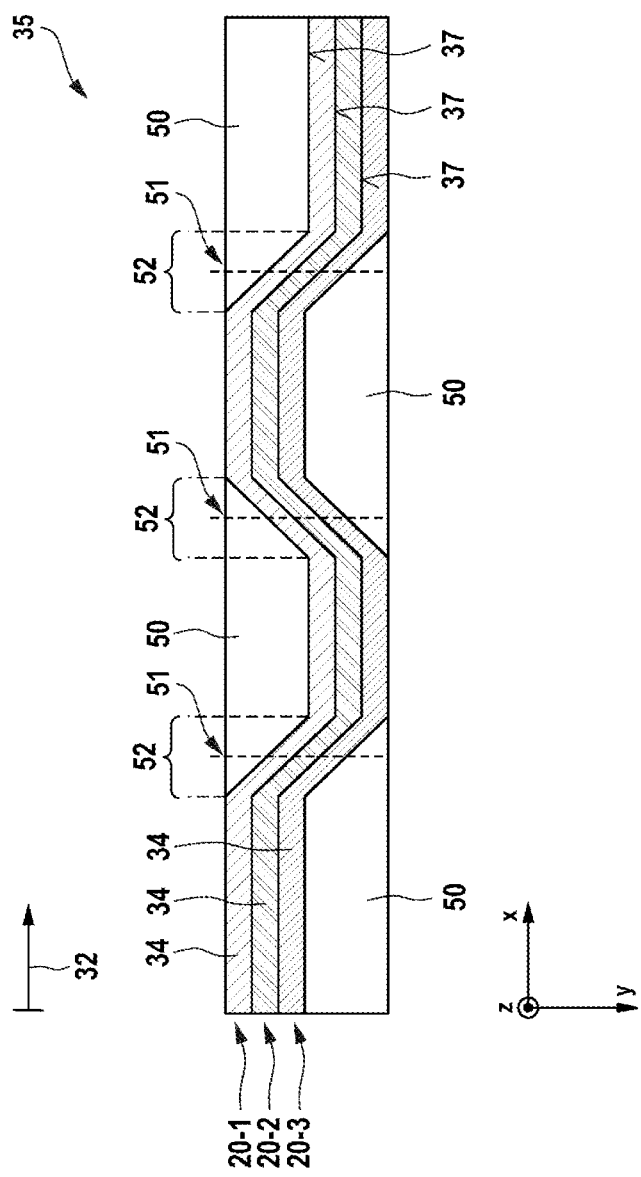

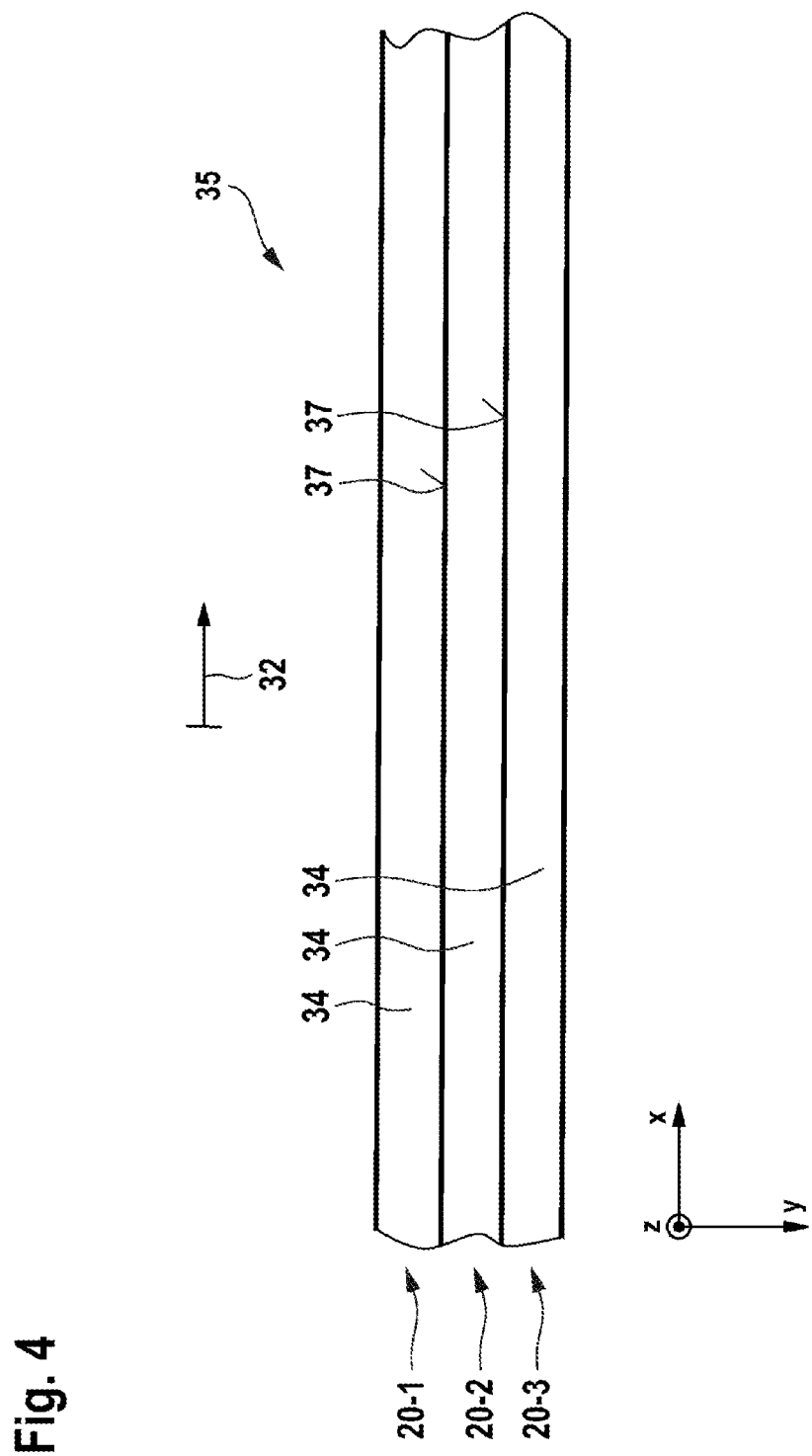

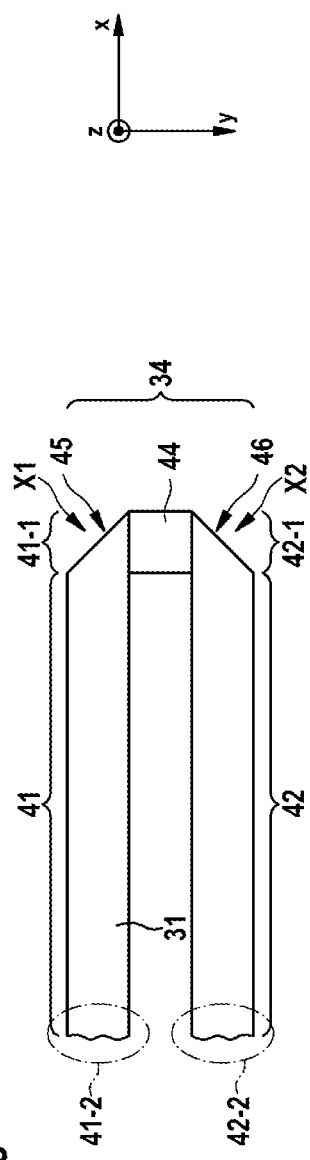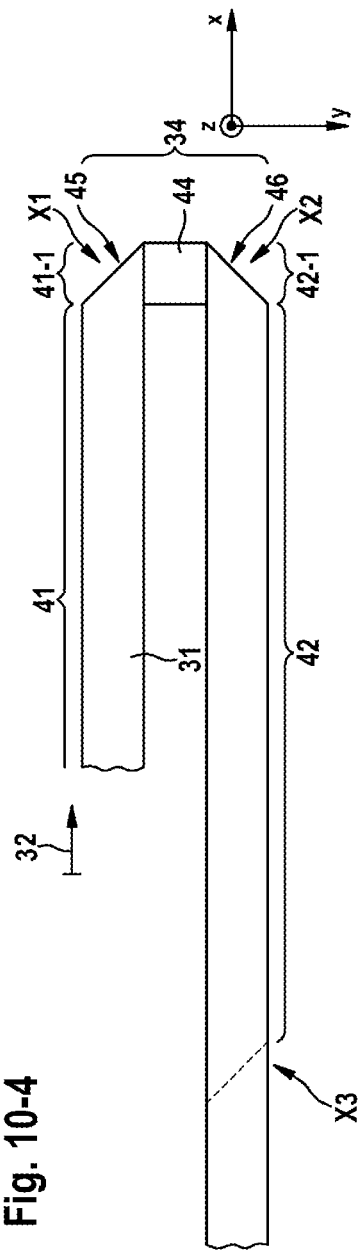
Fig. 10-3
Fig. 10-4

METHOD FOR PRODUCING A COIL ASSEMBLY, COIL ASSEMBLY, STATOR, AND MULTI-DIMENSIONAL DRIVE

This application is a 35 U.S.C. § 371 National Stage Application of PCT/EP2016/076026, filed on Oct. 28, 2016, which claims the benefit of priority to Serial No. DE 10 2015 221 710.8, filed on Nov. 5, 2015 in Germany, Serial No. DE 10 2016 204 721.3, filed on Mar. 22, 2016 in Germany, and Serial No. DE 10 2016 221 181.1, filed on Oct. 27, 2016 in Germany, the disclosures of which are incorporated herein by reference in their entirety.

BACKGROUND

The present invention relates to a method for producing a coil arrangement, to a coil arrangement, to a stator, and to a multi-dimensional drive. The present invention relates in particular to a method for producing a coil arrangement for a stator of a multi-dimensional drive, to a coil arrangement for a stator of a multi-dimensional drive, in particular of a planar drive, to a stator for a multi-dimensional drive, in particular for a planar drive, using a multiplicity of coil arrangements, and to a multidimensional drive, in particular a planar drive, having the stator.

In the case of multi-dimensional drive systems and in particular in the case of planar drives, magnetic fields are generated in multi-phase fashion in order, in magnetic interaction with a mover, to move said mover along one or more spatial directions. For this purpose, a drive of said type has a stator which generates the underlying magnetic field arrangement. Coil arrangements are used to generate the corresponding time-dependent magnetic fields.

In general, the coil arrangements are arrangements with a multiplicity of coils. These may have different structural forms. For example, use may be made of wound coils which are arranged in different variants in the plane. Here, however, it is accepted that only a certain fraction of the entire structural space of the coil can be filled with the conductive material of the windings.

A further disadvantage is relatively cumbersome assembly of the individual coils relative to one another.

Furthermore, in the case of the layered arrangement of the coils used in wound form, non-uniform field profiles can arise because the coils do not permeate one another, and there is thus always a preferential direction positioned closer to the desired point of action than a correspondingly different direction.

Also conceivable is the use of so-called multi-layer boards which are each constructed in the manner of a PCB structure. In relation to the use of wound coils, this has the advantage of considerably improved filling with conductive material. However, in the context of the PCB substrates, it must be noted that the conductive material used there is generally thick copper, whereby the production costs are not inconsiderable.

The predefined structure widths also delimit very small spacings between the conductors.

Furthermore, a respective PCB substrate is based on carrier layers which cannot be of arbitrarily thin form, such that, in the case of relatively thin conductor tracks, the fill factor of conductive material also decreases in the multi-layer board.

There is consequently a demand for creating a method for producing a coil arrangement, with which method a high fill factor of conductive material and good handlability and a high degree of electrical conductivity are achieved.

SUMMARY

The coil arrangement according to the invention has the advantage in relation thereto that, according to the invention, the advantages of a wound coil, specifically the relatively high electrical conductance, is combined with the advantage of a multi-layer board arrangement, specifically the high fill factor of conductive material. This is achieved according to the invention in that a coil arrangement of a stator of a multi-dimensional drive, in particular of a planar drive, is created, having at least one coil which is formed with a winding, wherein the winding is electrically conductive and has a winding material, and wherein the winding is a folded structure of the winding material with one or more turns. A flashover between adjacent turns is prevented by means of an insulation layer. The insulation layer may be formed by a lacquer or from anodized aluminum, wherein use may also be made of mixed conductors. Through the use of a strip-like winding material for forming the one or more turns of the winding of the coil arrangement, it is possible, for example in relation to a coil wound from a cylindrical wire, for the fill density of conductive material to be increased. At the same time, owing to the winding structure and the cross sections used, the electrical conductivity of the coil arrangement is not decreased. This advantageous combination of high fill factor of conductive material and high electrical conductance of the coil arrangement cannot be achieved with conventional means, for example with wound wire coils and/or with PCB-based multi-layer board arrangements.

The subclaims present preferred refinements of the invention.

It is preferably provided that the winding material is of strip-like form in a strip extent direction, in particular with a rectangular cross section perpendicular to the strip extent direction. In this way, it is made possible to construct flat planar coils.

In a preferred embodiment of the coil arrangement according to the invention, the production process is particularly simple if a single strip, in particular in the form of an endless strip, is used as winding material in order to form the turns of the winding of the coil arrangement therefrom.

Here, it is expedient in particular for the strip of the winding material to be formed from a drawn wire, because here, it is possible in particular for use to be made of conventionally produced basic materials that are already in stock.

Specifically with regard to the construction of relatively complex coil arrangements, it is advantageous if, instead of a single strip, a foil which has multiple strips is used in order to provide the strip for the winding material.

Particularly compact structures for the coil arrangement according to the invention can be obtained if the multiple strips in the foil are arranged at least partially in a transverse direction transverse and in particular perpendicular to the strip extent direction.

Particularly expedient characteristics are obtained if, in accordance with another preferred embodiment of the coil arrangement according to the invention, the winding material has an electrically conductive component which is formed in particular with a metallic material, copper or aluminum, and alternatively or additionally in coherent form.

Particularly reliable operation can be achieved with the coil arrangement according to the invention if the winding material and in particular the electrically conductive component forms a material core of the winding, and in particular the material core of the winding is, in the strip extent direction, at least partially covered by an insulation material.

Here, it is particularly advantageous if the insulation material has a coating additionally applied to the material core of the winding, in particular with a lacquer or oxide material, and/or a native and/or strengthened conversion coating and in particular an oxide layer of a material of the material core of the winding.

Specifically, the use of native or strengthened native oxide layers is particularly advantageous because a certain basic insulation of adjacent layers of a winding is already inherently realized from the structure of the underlying material core. The underlying native oxide layers are particularly thin, such that there is no particular increase in the overall thickness of a winding, as is conceivable in the case of lacquering.

An oxide layer additionally yields the advantage of thermal conductivity, for example in relation to PCB structures.

Coil arrangements are particularly advantageous if, for the multi-dimensional drive to be formed, they have a coil with a substantially planar construction.

In configuring the turns of the winding of a coil, there are different possible variations:

A particularly expedient orientation in different spatial directions can be achieved with the coil arrangement according to the invention as per a preferred embodiment if a turn of the winding (i) has mutually parallel first and second linear sections, whose first ends or whose second ends are in each case situated opposite one another in mutually adjacent fashion, and (ii) a connecting section, which connects the first ends of the linear sections to one another.

Here, a particularly suitable arrangement for the coil arrangement according to the invention is obtained if, preferably, the connecting section has a first fold in conjunction with the first end of the first linear section and has a second fold in conjunction with the first end of the second linear section.

In terms of process technology, further advantages are obtained if, in another embodiment of the present invention, the folds are connected to one another by means of a linear connecting piece and/or each of the folds has a turnover of the strip-like winding material through 180° at an angle of 45° with respect to the strip extent direction.

To reduce the current for the exciter coil arrangement with a simultaneous intensification of the magnetic field to be produced, it may be provided that a winding has a multiplicity of, in particular two to twelve, turns, and in particular, a transition section is formed at the transition between successive turns, which transition section connects the second end of one of the first or second linear sections of a turn to the second end of the second or first linear section, respectively, of a directly adjacent or directly preceding turn.

A particularly compact structure is realized for the coil arrangement if, in accordance with another embodiment, the transition section has a first fold in conjunction with the second end of the first or second linear section of one turn and a second fold in conjunction with the second end of the second or first linear section of the other turn, and the folds are in particular connected to one another by means of a linear connecting piece, and/or each of the folds has a turnover of the strip-like winding material through 180° at an angle of 45° with respect to the strip extent direction.

The present invention furthermore relates, according to another aspect, to a stator of a multi-dimensional drive, in particular of a planar drive. This is characterized in that it has a multiplicity of coil arrangements designed according to the invention, wherein, in particular, at least a part of the multiplicity of coils are arranged so as to be nested and/or interlaced one inside the other and are commensurably assigned to a corresponding multiplicity of phases of an exciter signal in order to have the latter applied thereto. This yields the possibility of designing a drive which is multi-dimensional, that is to say with mutually independent closed-loop control in mutually different spatial directions. The closed-loop control capability by means of different phases of an exciter signal permits an increase in the accuracy of the drive action to be imparted.

In an advantageous embodiment of the stator according to the invention, it is provided that first and second sets of multiplicities of coil arrangements according to the invention are formed. The coil arrangements of the first set and the coils thereof are oriented and/or arranged in a common first spatial direction. The coil arrangements of the second set and the coils thereof are oriented and/or arranged in a common second spatial direction which differs from the first spatial direction and which is in particular oriented perpendicular to said first spatial direction.

In a further aspect of the present invention, a multi-dimensional drive, in particular a planar drive, is created, which has a stator according to the present invention and a mover which comprises a magnet device which is intended and designed for magnetic interaction with a magnetic field which is to be produced, or which can be generated, by the stator.

The present invention also relates to a method for producing a coil arrangement of a stator of a multi-dimensional drive, which coil arrangement is constructed in particular in accordance with the present invention, in which method at least one coil is formed with a winding, wherein the winding is electrically conductive and has a winding material, the winding material is of strip-like form in a strip extent direction, in particular with a rectangular cross section perpendicular to the strip extent direction, and the winding is formed as a structure, which is wound and/or folded in the strip extent direction, of the strip-like winding material with one or more turns.

The invention also relates to a method for producing a coil arrangement. This method has the advantage that, with improved handlability, the advantages of a wound coil, specifically the relatively high electrical conductance, is combined with the advantage of a multi-layer board arrangement, specifically the high fill factor of conductive material. It is thus provided that a method for producing a coil arrangement, in particular in the form of a flat coil and/or for a stator of a multi-dimensional drive, is created, in which method at least one coil is formed with an electrically conductive winding with or composed of a winding material, and the winding is formed as a structure, folded by folding at a fold point, of the strip-like winding material with one or more turns.

It is preferably provided that the winding material is—at least partially, locally and/or in sections—of strip-like form in a strip extent direction, in particular with a rectangular cross section perpendicular to the strip extent direction. It is furthermore advantageous if, as winding material, use is made of a foil which has one or more strips, or of one or more strips of a foil of said type. A particularly high level of productivity in the production of a coil arrangement and improved compactness of the resulting coil arrangement itself are achieved in that, as a winding material, a foil is used which has one or more strips, or else in that one or more strips of a foil of said type are used. Through the provision of the foil structure in this form, it is possible, as winding material, for the strips provided with the foil to be directly used for forming the turns of the coil arrangement, in particular in the form of one or more flat coils.

To be able, in an economic manner, to design and produce as compact as possible a structural form of the coil arrangement to be produced, it is provided in an advantageous refinement of the method according to the invention that the one or more strips in the foil are—at least partially, locally and/or in sections—arranged in a transverse direction transverse and in particular perpendicular to the strip extent direction.

A particularly compact form of the coil arrangement to be produced can be achieved in particular if, in accordance with another preferred refinement of the method according to the invention, an areal and coherent material region is used as a foil.

In addition to the configuration of the foil as a coherent material region in itself, it is also expedient for a foil of said type to be assembled from prefabricated individual strips. Accordingly, in a preferred refinement of the method according to the invention, it is provided that a material region with or composed of connected and joined-together individual strips, in particular with a connecting material or embedding material in between, is formed and/or used as a foil.

In addition or alternatively, it may be advantageous if individual strips are assembled to form a foil in order to thereby locally influence the material configuration of the coil arrangement to be produced.

Here, the handling of the foil assembled from individual strips can be improved if, in accordance with a preferred embodiment of the method according to the invention, a foil is formed and/or used which has at least one first carrier foil and individual strips applied thereto and/or embedded therein, in particular with a second, covering carrier foil.

To realize the electrical independence and separation of different layers and windings with respect to one another, it is particularly advantageous if directly adjacent strips of the multiple strips in the foil are formed with an electrical insulation between them.

Here, the mutual electrical insulation may be realized by means of various measures.

In one advantageous refinement of the method according to the invention, it is provided that an electrical insulation (i) is formed by means of local oxidation or anodizing and/or (ii) by means of a local removal of material and refilling with material.

To achieve a high overall level of electrical conductivity of the coil arrangement to be produced, it is advantageous if, as winding material, use is made of a material with an electrically conductive component, which is formed in particular with a metallic material, copper or aluminum, and/or in coherent form.

In addition or alternatively, it may be provided that a coating additionally applied to the electrically conductive component, in particular with a lacquer or oxide material, and/or a native and/or strengthened conversion coating and in particular an oxide layer of the electrically conductive component, are formed and/or used as insulation material.

According to a further aspect of the present invention, a coil arrangement for a stator of a multi-dimensional drive, and in particular for a planar drive, is also created. This coil arrangement is, according to the invention, formed by means of the proposed production method.

Here, it is provided in particular that the coil arrangement is formed with at least one coil which is formed with an electrically conductive winding with a winding material, wherein the winding material is—at least partially, locally and/or in sections—of strip-like form in a strip extent direction, in particular with a rectangular cross section perpendicular to the strip extent direction, and wherein the winding is a structure, wound and/or folded in the strip extent direction, of the strip-like winding material with one or more turns.

The present invention furthermore creates a stator for a multi-dimensional drive, and in particular for a planar drive.

The stator according to the invention is formed with a multiplicity of coil arrangements produced according to the invention.

Here, it is provided in particular that at least a part of the multiplicity of coils of the coil arrangements are arranged so as to be nested or interlaced one inside the other and are commensurably assigned to a corresponding multiplicity of phases of an exciter signal in order to have the latter applied thereto.

In an advantageous refinement of the stator according to the invention, first and second sets of one or more coil arrangements are are by means of a method according to the invention, wherein coil arrangements of the first set and the coils thereof are oriented and/or arranged in a common first spatial direction x, and wherein coil arrangements of the second set and the coils thereof are oriented and/or arranged in a common second spatial direction y which differs from, and is in particular oriented perpendicular to, the first spatial direction x.

The present invention furthermore creates a multi-dimensional drive and in particular a planar drive. The drive according to the invention has in particular a stator designed according to the present invention and a mover, wherein the latter has a magnetization for magnetic interaction with a magnetic field that can be generated by the stator.

It is advantageously also made possible for windings to be produced easily, inexpensively and in a time-saving manner. At the same time, it is made possible for raw material for producing the coil arrangement to be provided, wherein the coil arrangement can be produced from the raw material quickly and easily. In particular, the coil arrangement comprises areal coils which may have any desired dimensions and which can be easily and inexpensively combined to form the coil arrangement.

The coil arrangement of a workpiece carrier system preferably comprises at least one main body. The main body has at least one conductor track. It is provided here that the conductor track has a multiplicity of longitudinal sections and transverse sections. Furthermore, the main body has at least one fold point. The main body is folded at the fold point. By means of the fold, at least two longitudinal sections and at least two transverse sections of the conductor track run in spiral fashion. The main body is particularly advantageously folded at a multiplicity of fold points. In this way, a turn of a coil can be represented by a fold. In this way, the coils can be produced easily and inexpensively, because it is merely necessary for conductor tracks which have a multiplicity of longitudinal sections and transverse sections to be applied to the main body. By means of a simple processing step, the folding, the main body with the at least one conductor track can be easily and inexpensively manufactured into a coil. It is particularly advantageously provided that the longitudinal sections are longer than the transverse sections. By means of the folding of the workpiece carrier, an areal, in particular elongate, coil can thus be generated.

It is preferably provided that the longitudinal sections run parallel to one another. It is furthermore preferably provided that the transverse sections run at an angle of between 0° and 90° with respect to the longitudinal sections. It is thus provided that, after a folding process, the longitudinal sections are arranged opposite one another. A connection of the longitudinal sections to one another is made possible by means of the transverse sections. This permits simple and inexpensive production of a coil by folding of the main body with the at least one conductor track.

The at least one fold point runs preferably perpendicular to the longitudinal sections and centrally through the transverse sections. In this way, the conductor track is shaped such that two longitudinal sections run parallel to and opposite one another, while each transverse section transitions into a curved shape. This leads to the formation of a spiral, wherein the spiral can be enlarged by folding at a multiplicity of such fold points. A coil can be produced easily and inexpensively in this way.

Each conductor track extends preferably monotonously along an extent direction. The main body thus has the extent direction along which each conductor track extends. "Monotonously" is to be understood to mean that the conductor track does not extend counter to the extent direction at any point of the main body. It is particularly preferably provided that each conductor track extends strictly monotonously along an extent direction. This is to be understood to mean that the conductor track, in addition to the definition given above, also does not run exactly perpendicular to the extent direction.

The coil arrangement preferably has a first main body and a second main body. It is provided here that the first main body and the second main body are nested one inside the other by alternate folding. In this way, it is possible to provide multiple coils for the coil arrangement. In particular, multiple coils are required for moving a workpiece carrier in a plane. To nevertheless ensure an identical average spacing of the workpiece carrier to each coil, the coils are nested. Such nesting can be produced easily and inexpensively by means of the coil arrangement by virtue of alternate folding of the first main body and of the second main body being performed successively. In this way, the main bodies overlap one another, which leads to a nested configuration. If more than two different directions are required of the drive, this is likewise possible. The coil arrangement may therefore have further main bodies which are nested with the first main body and with the second main body.

The longitudinal sections of the at least one conductor track of the first main body are particularly advantageously oriented perpendicular to the longitudinal sections of the at least one conductor track of the second main body. It is ensured in this way that a workpiece carrier can, by means of the coil arrangement, be moved in all directions within a three-dimensional space. The freely floating workpiece carrier can thus be moved in any desired manner.

The main body preferably has two insulation elements. The at least one conductor track is incorporated between the insulation elements. It is thus provided in particular that the conductor track is fully insulated with respect to an environment. This insulation is realized in particular mechanically and/or electrically. The insulation elements are preferably foils which can be welded to one another. Other, in particular cohesive, fastening methods are alternatively possible. The conductor track is advantageously a punched element which can be prefabricated. The conductor track is thus protected by the insulation elements. At the same time, the insulation elements permit folding of the main body.

The production method for producing the coil arrangement comprises in particular the following steps: firstly, at least one main body which has at least one conductor track is provided. It is provided here that the conductor track has a multiplicity of longitudinal sections and transverse sections. Subsequently, the main body is folded at at least one fold point. The fold point is preferably predefined. In this way, the conductor track is shaped such that at least two longitudinal sections and at least two transverse sections run in spiral fashion. Thus, by means of the folding process, a coil which can be used in a coil arrangement of a workpiece carrier can be produced easily and inexpensively. Here, the coil can be shaped as desired in a manner dependent on the configuration of the longitudinal sections and transverse sections. The folding provides a straightforward means of shaping the conductor track into a coil.

The provision of the main body advantageously comprises the following steps: firstly, two insulation elements are provided. The insulation elements may in particular be foils. The insulation elements have already been described above. Furthermore, at least one conductor track is preferably provided. The conductor track may in particular be a piece cut out from a metal sheet. The conductor track can be produced in particular by punching. A step of inserting the conductor track between the insulation elements is subsequently performed. It is thus possible in particular to provide a variable conductor track in the main body. Depending on the usage situation, the conductor track may have different longitudinal sections and/or transverse sections. These can be realized easily and inexpensively by means of a punching process. The insertion between the insulation elements is subsequently performed, such that the conductor track is protected against external influences.

It is particularly preferably provided that the conductor track is punched out of a raw material by means of a punching process. The raw material is in particular a sheet-metal element. If, as is preferable, multiple conductor tracks are provided in the main body, then it is preferably the case that multiple conductor tracks, in particular multiple similar conductor tracks, are punched out of the raw material by means of one punching step. All of these conductor tracks can then be provided in the main body by being inserted between the insulation elements. By means of the insertion into the insulation elements, it is thus the case that all of the conductor tracks are fixed in their relative orientation with respect to one another. A displacement and/or slippage of the conductor tracks is thus prevented.

It is preferably provided that, by means of the coil arrangement, a magnetic workpiece carrier is movable, in freely floating fashion above the coil arrangement, in six independent degrees of freedom. Thus, the workpiece carrier is fully movable by means of the coil arrangement. The coil arrangement thus constitutes a stator of a planar drive.

It is preferable for two main bodies to be used. The two main bodies are oriented at an angle of 90° with respect to one another. In particular, the direction of each main body is determined by the longitudinal sections of the conductor tracks. If three main bodies are used, then it is advantageous for all of the main bodies to assume an angle of 120° with respect to one another. Alternatively, two main bodies may assume an angle of 90° with respect to one another, whereas a third main body assumes an angle of 45° with respect to the two other main bodies. Other angles are likewise possible.

BRIEF DESCRIPTION OF THE DRAWINGS

Exemplary embodiments of the invention will be described in detail below with reference to the accompanying drawings.

FIGS. 3 and 4 show, in plan view, embodiments of foils that can be used in an embodiment of the method according to the invention for producing a coil arrangement.

FIGS. 5-1 to 6-3 show, in schematic and sectional side views, intermediate states that arise during the production of foils for forming coil arrangements.

FIGS. 10-1 to 10-6 are schematic plan views of various intermediate states that arise during the production according to the invention of a winding of a coil arrangement.

FIG. 11-1 shows, in a schematic and perspective plan view, aspects of a coil arrangement produced according to the invention.

FIG. 11-2 shows, in a schematic and partially sectional perspective view, aspects of a strip used during the production according to the invention of a coil arrangement.

DETAILED DESCRIPTION

Exemplary embodiments of the invention will be described in detail below with reference to FIGS. 1 to 26. Identical and equivalent elements and components, and elements and components of identical or equivalent action, are denoted by the same reference designations. The detailed description of the designated elements and components will not be repeated every time they appear.

The illustrated features and further characteristics may be isolated from one another in any desired form and combined with one another in any desired manner, without departing from the core of the invention.

Figure 1:
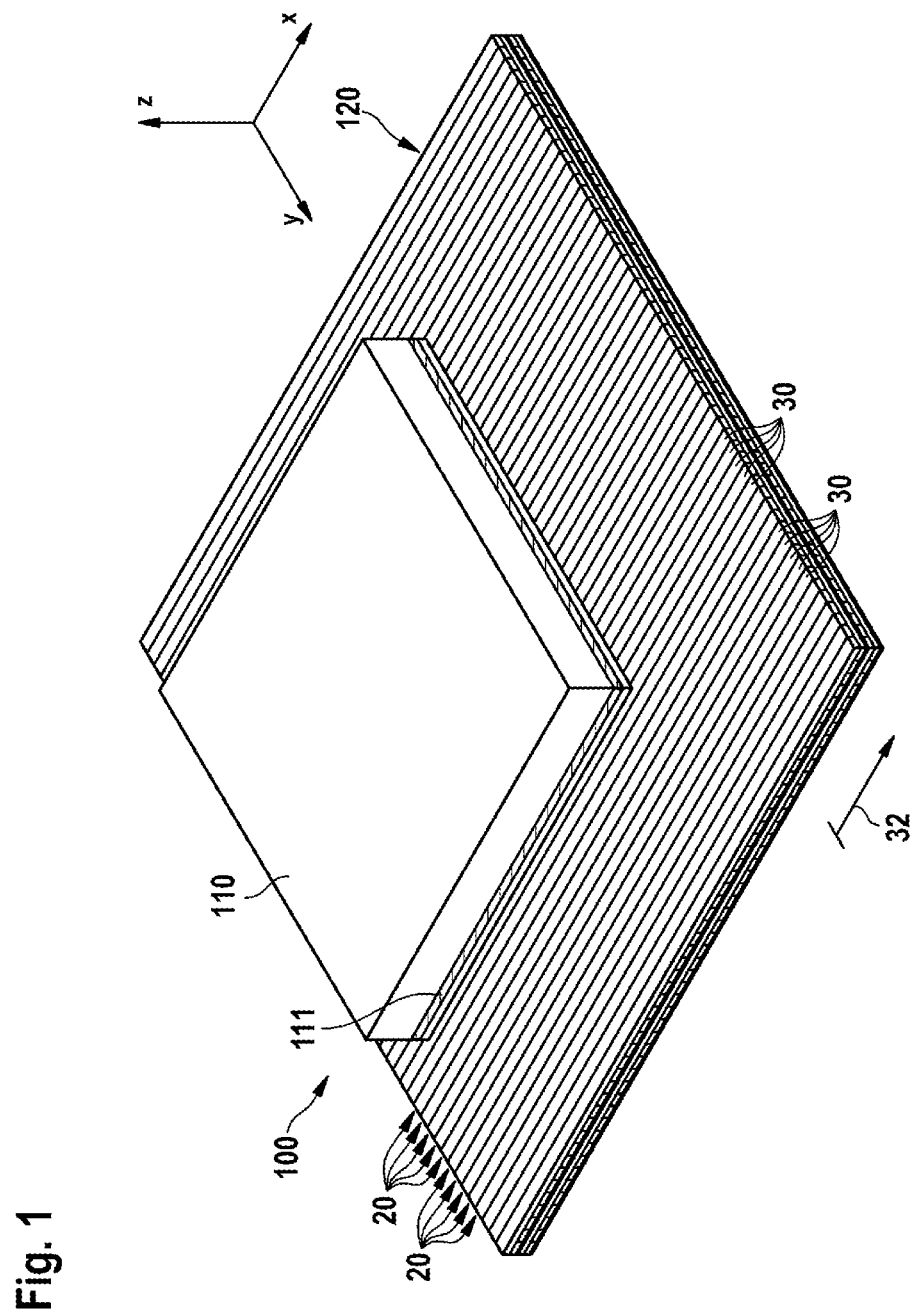
FIG. 1 is a perspective plan view of a multi-dimensional drive according to the invention.

FIG. 1 shows, in a perspective plan view, a multi-dimensional drive 100 according to the invention, which is formed from a stator 120 arranged in a plane parallel to the xy plane and which a multiplicity of coils 20 with windings 30 within a coil arrangement 10 according to the invention along the x direction and within a corresponding coil arrangement 10 with a multiplicity of coils 20 and windings 30 in the y direction. On the top side of the stator 120, there is arranged a movement element, which is also referred to as mover 110. On its bottom side, the mover 110 has a magnet device 111. This may be formed by an arrangement of permanent magnets.

Figure 2:
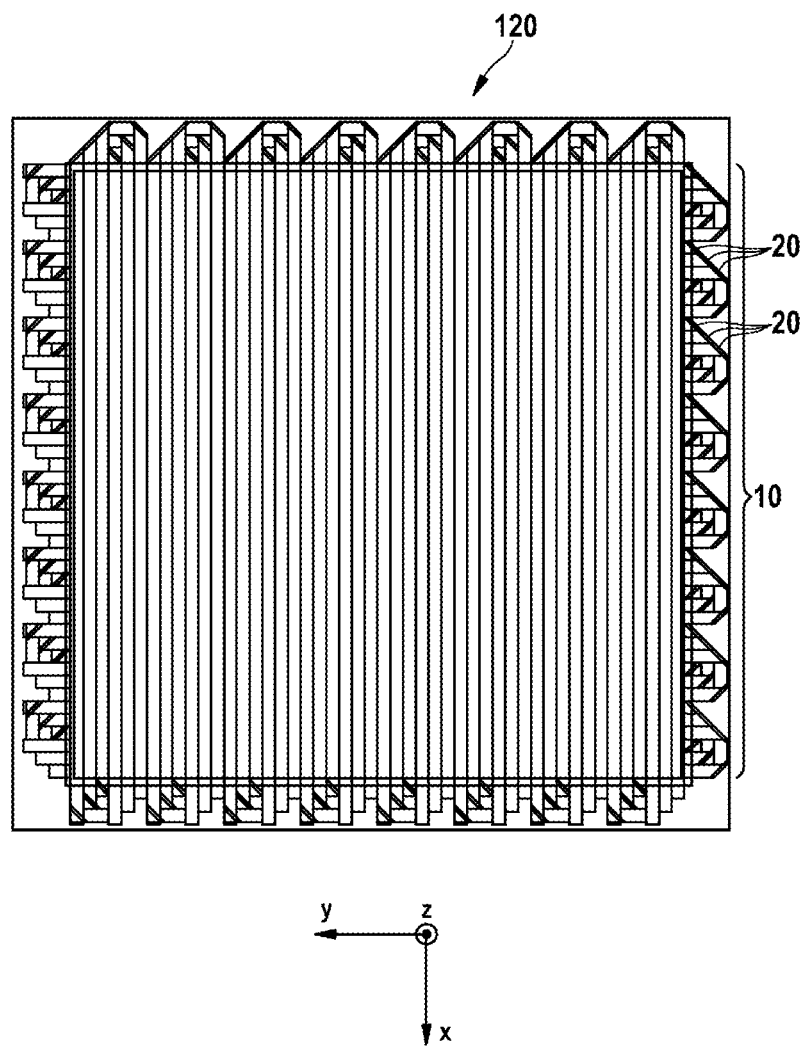
FIG. 2 is a schematic and partially sectional plan view of a stator of an embodiment of the multi-dimensional drive according to the invention.

During operation, the stator 120 has electrical current applied thereto in controlled fashion with a multi-phased control such that the coil arrangements 10 with the coils and the windings 30 generate a magnetic alternating field along the x direction and along the y direction, which alternating field, in interaction with magnetic fields of the magnet device 111, the mover 110 is movable in a controlled manner multi-dimensionally substantially in the xy plane in the embodiment of FIG. 2.

With restriction, actuation is possible in all six degrees of freedom.

FIG. 2 is a schematic and partially sectional plan view of a stator 120 with coil arrangements 10 according to the invention in the x direction and in the y direction and with corresponding coils 20 which have windings 30.

It can be seen in FIG. 2 that, in the x direction and in the y direction, the coils 20 of the coil arrangements 10 are nested or interlaced one inside the other multiple times in the x and y directions in order to be able to generate, along the respective x and y directions and in accordance with a multiplicity of phases of an alternating current that are used, different phases of a magnetic field which have a temporal-spatial relationship with respect to one another so as to be able to realize the desired multi-dimensional movement.

Figures 1, 5:
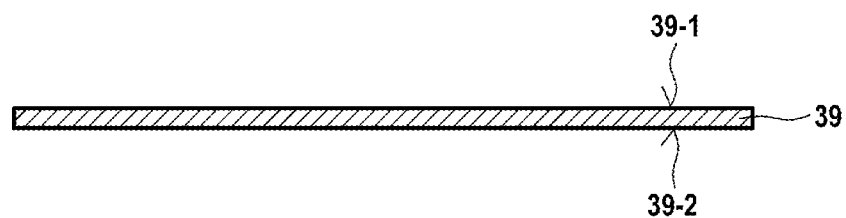
Figures 2, 5:
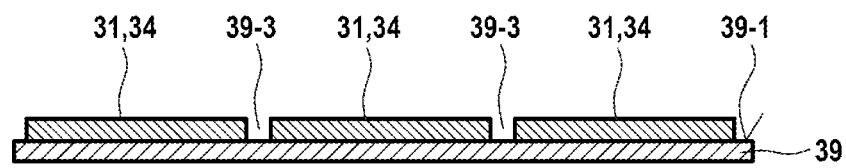
Figures 3, 5:
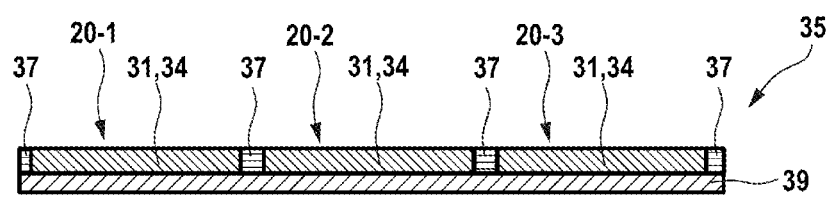

FIG. 3 shows a first embodiment of a foil 35 which can be used in an embodiment of the method according to the invention for producing a coil arrangement 10.

The foil 35 as per FIG. 3 has three conductor tracks in the form of foil strips 34 which are assigned to three coils 20 to be formed, also referred to as coils 20-1, 20-2, 20-3, which, along a strip extent direction 32 as main direction—in this case parallel to the x direction—have strip sections running parallel to one another in sections, which are directly adjacent to one another in a transverse extent direction—in this case in particular parallel to the y direction—and which, substantially perpendicular to the strip extent direction 32 and between one another, have an insulation 37.

Between the individual strip sections of the foil strips in the strip extent direction 32, there are formed fold sections 52 with fold lines 51. The fold lines 51 run perpendicular to the strip extent direction 32.

Between sections of the foil strips 34 parallel to the strip extent direction 32, sections of the foil strips 34 in the fold region 52 are formed at an angle of in this case 45° with respect to the strip extent direction 32 as main direction. There, too, the sections of the foil strips 34 run parallel to one another, are arranged directly adjacent to one another and are electrically insulated with respect to one another by means of the insulation 37.

During the production method using the foil 35 illustrated in FIG. 3, it is possible, with multiple folding along the fold lines 51 by means of a relatively simple folding process, to create a multiplicity of windings 30, in this case for the three coils 20-1, 20-2, 20-3.

Further aspects of this structure and of the associated relatively simple folding processes will be discussed in conjunction with the further FIGS. 7, 8 and 9.

By means of the strip sections of the individual foil strips 34 in the fold region 52 at a 45-degree angle, non-contacted or inactive regions 50 are formed between adjacent fold regions 52 with fold lines 51, which non-contacted or inactive regions are not available for the structure of the coils 20-1, 20-2, 20-3 to be formed of the coil arrangement 10 to be produced. Predominantly no material, or possibly only an auxiliary material, is formed here.

Figures 4, 5:
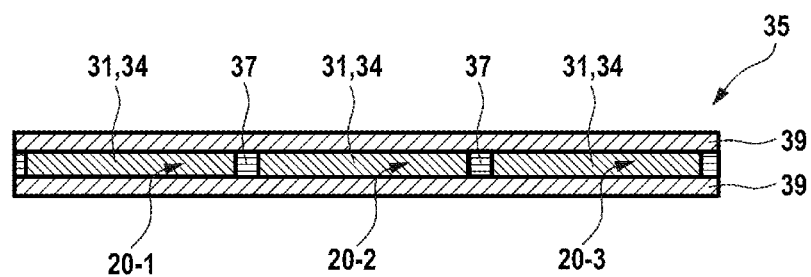

As an alternative to the structure illustrated in FIG. 3 for a foil 35, a simplified embodiment of the foil 35 as per FIG. 4 may be used.

In this case, too, multiple foil strips 34, of which there are in this case again three, are arranged parallel to one another along a strip extent direction 32 as main direction, directly adjacent to one another parallel to the x direction, and from one another by an electrical insulation 37. The individual foil strips 34 are again assigned to different coils 20-1, 20-2, 20-3, which are formed according to the invention in conjunction with a corresponding folding process.

In the embodiment as per FIG. 4, the structure of the individual foil strips 34, which for simplicity are also simply referred to as strips, with their insulation 37 in between is of simpler design in relation to the embodiment of FIG. 3. However, this simplified structure results in a relatively complex folding process, as will also be described in conjunction with the further FIGS. 10-1 to 18.

FIGS. 5-1 to 5-4 show aspects of individual steps of an embodiment of the production method according to the invention for an embodiment of the foil 35.

The starting point, as per FIG. 5-1, is a carrier 39, likewise in the form of a foil and formed with a top side 39-1 and a bottom side 39-2.

In the transition to the state as per FIG. 5-2, an arrangement of strips 34 composed of a winding material 31 of electrically conductive form is formed on the top side 39-1, wherein intermediate spaces 39-3 remain between mutually directly adjacent strips 34.

In the transition to the intermediate state shown in FIG. 5-3, the intermediate spaces 39-3 are filled with an insulation 37.

The arrangement thus obtained is then optionally, in the transition to the intermediate state shown in FIG. 5-4, covered with a further carrier 39.

In embodiments of the production method according to the invention, foils 35 may be used both without a cover carrier 39, as per FIG. 5-3, and with a cover carrier 39, as per FIG. 5-4.

Figures 1, 6:
Figures 2, 6:
Figures 3, 6:
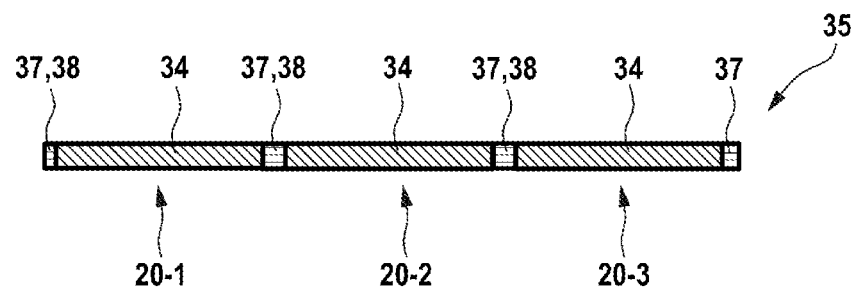

As an alternative to the production of the foil 35 that can be used according to the invention in accordance with FIGS. 5-1 to 5-4, a foil 35 of said type may also be produced in accordance with the sequence as per FIGS. 6-1 to 6-3.

The starting point here is the provision of a winding material 31 with or composed of a coherent electrically conductive component 31-1.

By means of a structuring measure 80, at predetermined regions in the coherent electrically conductive component 31-1, either the material forming the basis of the conductive component 31-1 is directly converted into an insulation 37, or firstly a gap is formed, which gap is filled with a connecting material 38 in order to thus form the insulation 37.

As per FIG. 6-3, the foil 35 is then formed with strips 34 with or composed of the conductive component 31-1 of the winding material 31 and with the insulation 37 in between, which insulation also serves as a connection 38 between the strips 34.

Figure 7:
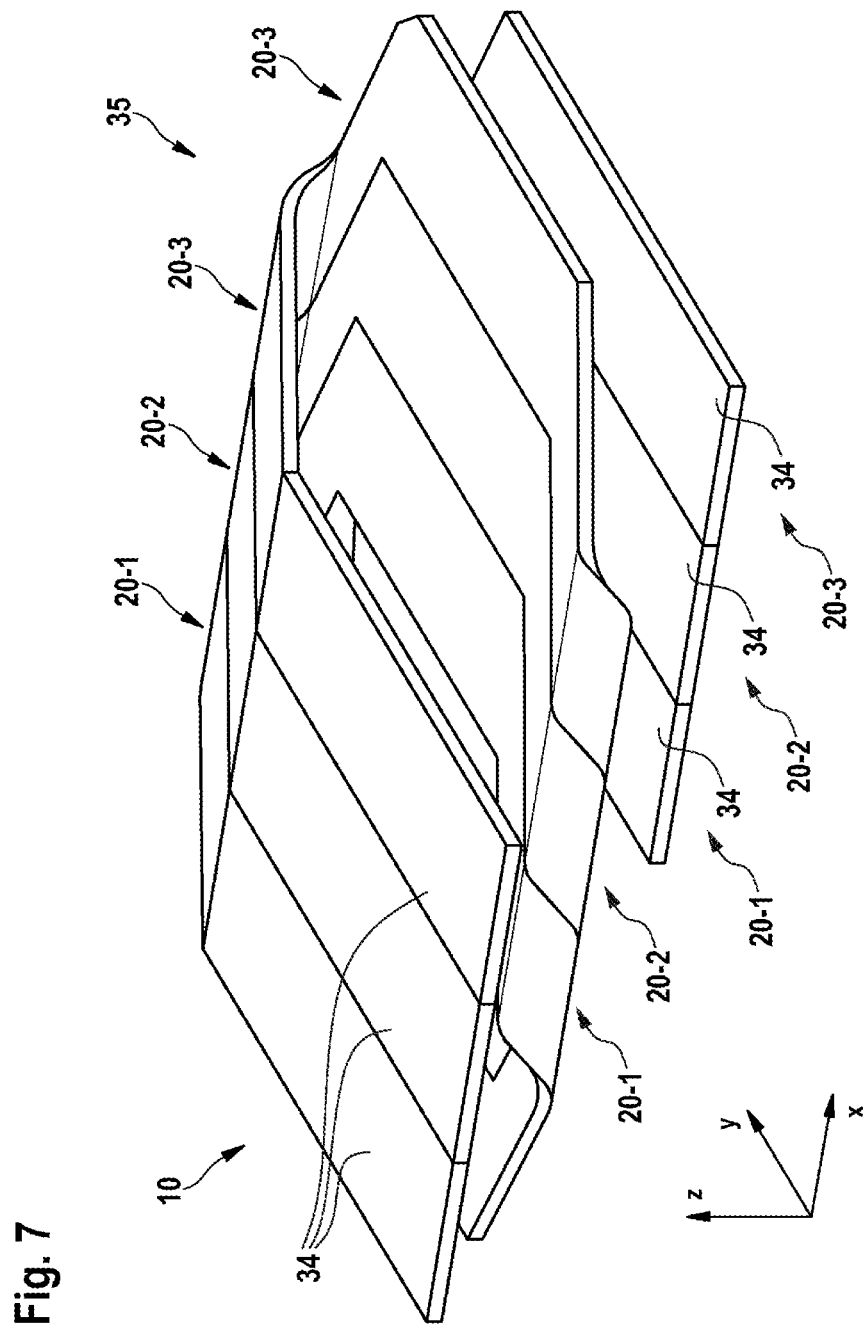
FIGS. 7 to 9 show intermediate states of folding processes.
Figure 8:
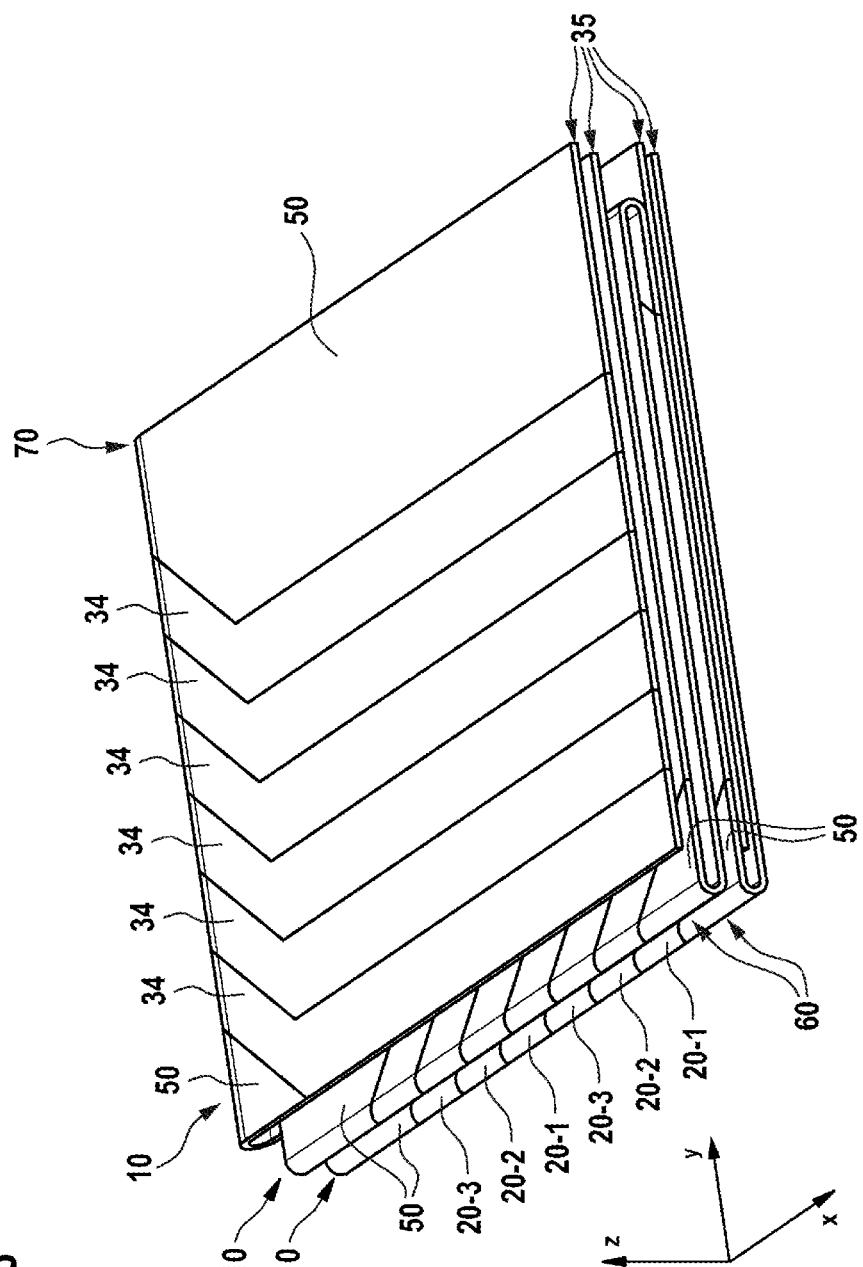
Figure 9:
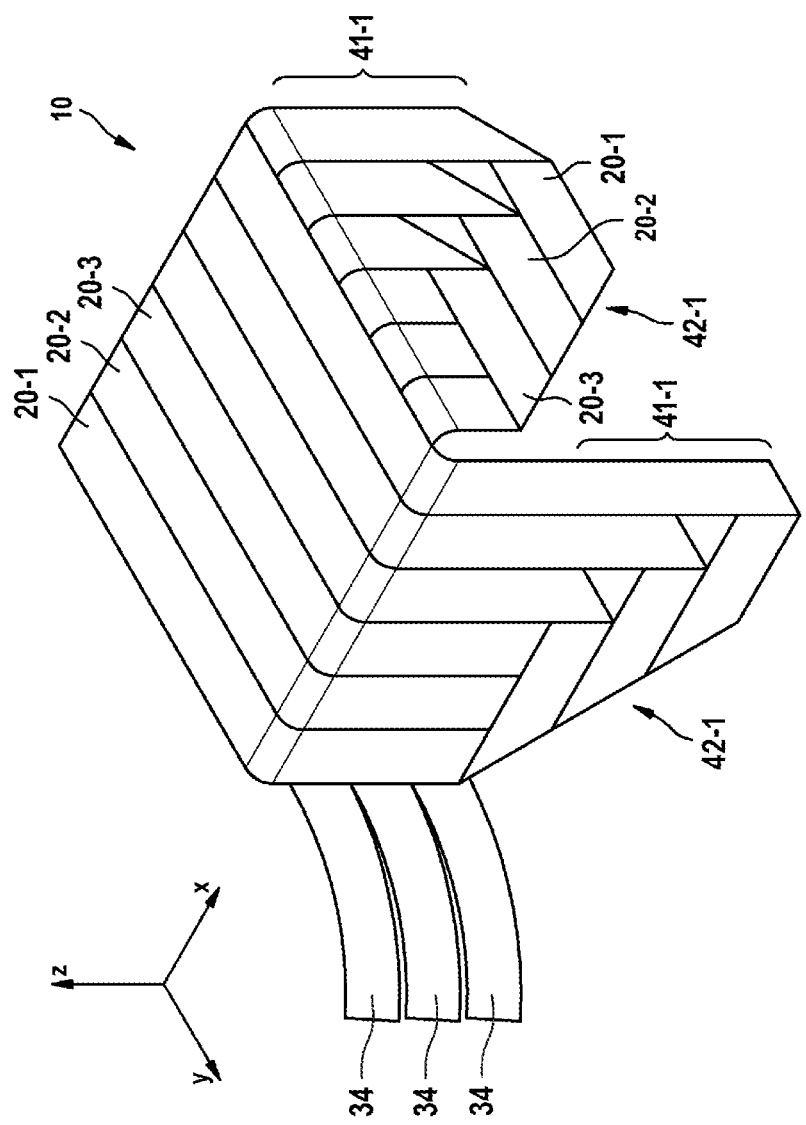

FIGS. 7 to 9 describe details of an embodiment of the production method according to the invention using a foil 35 as has been discussed in conjunction with FIG. 3.

After folding along the fold lines 51 in the fold regions 52, the three-dimensional structure illustrated in FIG. 7 for a coil arrangement 10 with three coils 20-1, 20-2, 20-3 is firstly formed, wherein, for each track or line in this embodiment, for in each case two layers or planes for each of the coils 20-1, 20-2, 20-3, a turn or current loop is produced.

By virtue of a multiplicity of such structures being nested one inside the other as per FIG. 7, the arrangement illustrated in FIG. 8 is realized, which is composed of a multiplicity of coil arrangements 10 as per FIG. 7, specifically with a coil arrangement 60 for the x direction and a coil arrangement 70 for the y direction, in each case with first, second and third coils 20-1, 20-2, 20-3, which are in each case assigned to the corresponding current phases and are produced on the basis of the foil 35 described above.

It is in turn possible to see the inactive regions 50 of the foil 35, as have been discussed in detail above.

FIG. 9 shows an intermediate state in conjunction with the folding process for an arrangement of coils 20-1, 20-2, 20-3 in which the ends 41-1 and 41-2 form or have bent winding heads of the individual coils 20-1, 20-2, 20-3.

Figures 1, 10:
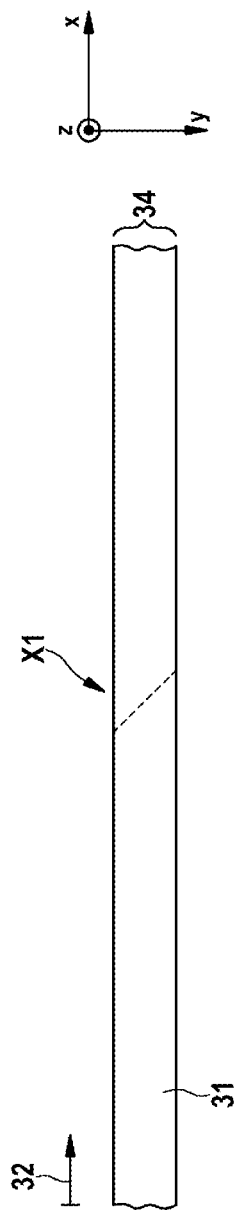
Figures 2, 10:
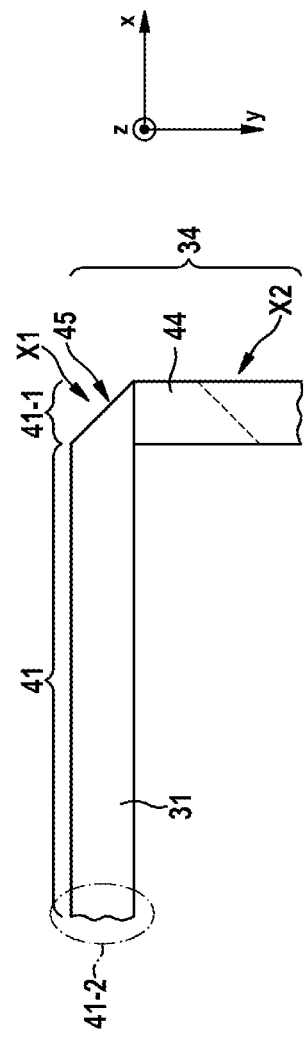
Figures 5, 10:
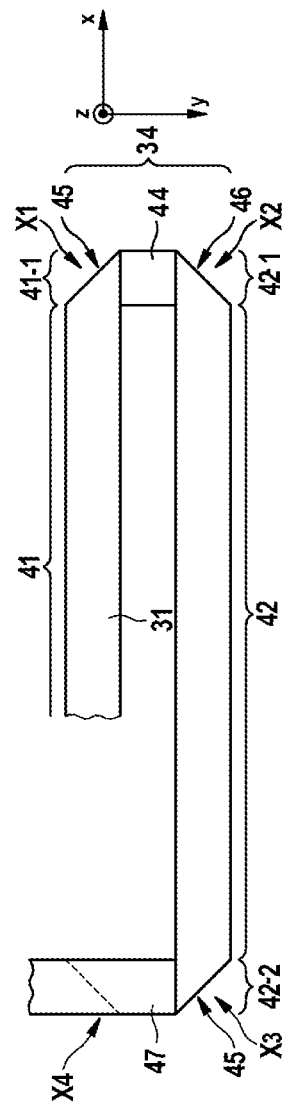
Figures 6, 10:
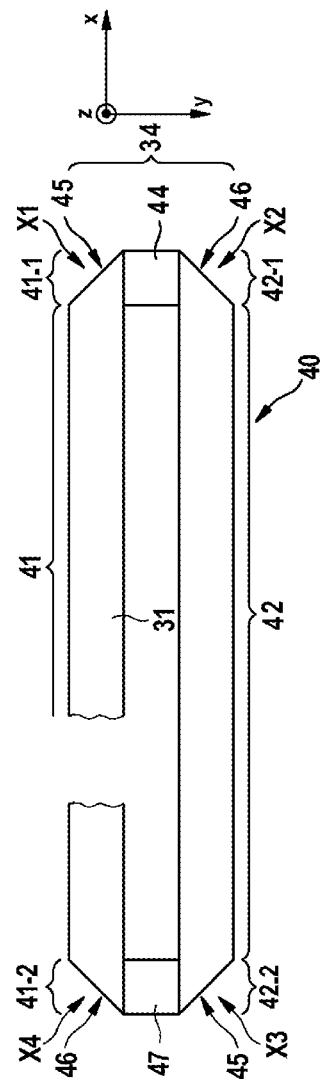

Below, details will be described which relate in particular to the local construction of the fold structures in the formation of a coil arrangement 10 from a foil 35:

FIGS. 10-1 to 10-6 show different phases of construction of a turn 40 of a winding 30 of a coil 20 of a coil arrangement 10 according to the invention.

As per FIG. 10-1, the starting point is a single foil strip 34, which will hereinafter also be referred to simply as strip, and which is composed of a winding material 31.

The strip 34 with the winding material 31 has a strip-like construction along an extent direction 32, which is also referred to as main extent direction. The extent direction 32 corresponds, in the state shown in FIG. 10-1, to the x direction. In a first transverse extent direction, which in this case corresponds to the y direction, the strip 34 has a particular width. In a second transverse extent direction, which in this case corresponds to the z direction, the winding material 31 of the strip 34 has a certain height or thickness. The cross-sectional form of the strip 34 is preferably rectangular in the section of a section plane parallel to the yz plane.

At a certain point X1, in the transition from the state as per FIG. 10-1 to the state as per FIG. 10-2, one free end of the strip 34, in this case the end on the right-hand side in FIG. 10-1, is turned over downward and forward, such that, in the region of the point X1, a first end 41-1 with a first fold 45 is formed, and the turned-over free end of the strip 34 now points in the y direction.

Here, a minimum bending radius is sought, ideally of close to zero at the inside.

This gives rise to a first linear section 41 in the original strip extent direction 32, and a free end of the strip 34 which runs perpendicularly downward in the y direction.

The thus defined first end 41-1 of the first linear section 41 is then adjoined by a short section which functions as a connecting piece 44 and which, at its end, has a second point X2.

In the transition to the state shown in FIG. 10-3, the free end of the strip 34 is, with the connecting piece 44 that adjoins the first fold 45, turned over upward at an angle of 45° at the point X2 in order to thereby form a second fold 46, which is adjoined by a second linear section 42 of the strip 34.

In the intermediate state shown in FIG. 10-3, a first linear section 41 and a second linear section 42 lie, which have first ends 41-1 and 42-1 which are situated opposite one another and second ends 41-2 and 42-2 which are likewise situated opposite one another. The first and second linear sections 41 and 42 are oriented approximately parallel to one another and form a planar structure. The second linear section 42 runs counter to the original strip extent direction 32 and thus in a direction antiparallel to the x direction.

In this way, in FIG. 10-3, a first half winding of the coil 20 of the coil arrangement 10 is formed.

At the second end 42-2 of the second linear section 42, opposite the second end 41-2 of the first linear section 41, a further position X3 is defined which serves for the formation of a first fold 45 at the second end 42-2 of the second linear section 42 of the strip 34 by virtue of the free end of the strip 34 being turned over downward at an angle of 45°. The free section of the strip 34 is oriented perpendicular to the original strip extent direction 32 and counter to the y direction.

Said first fold 45 at the second end 42-2 is adjoined by a transition section 47 of the free end of the strip 34, which transition section is situated opposite the connecting piece 44 at the first ends 41-1 and 42-1 of the first and second linear sections 41, 42.

At the end of the transition section 47, a position X4 is defined which serves for the formation of a second fold 46 of the free end of the strip 34. Said second fold 46 is performed by virtue of the second end of the strip 34 being turned over upward at an angle of 45°, such that then, as per FIG. 10-6, the free end of the strip 34 is again oriented in the direction of the original strip extent direction 32.

By virtue of the fold at the position X4 being performed downward—said fold is performed upward in the illustration in FIGS. 10 to 13—a spiral-shaped coil form can be achieved.

By means of the sequence of the states of FIGS. 10-1 to 10-6, a single turn 40 of the winding 30 of a coil 20 of the coil arrangement 10 according to the invention is formed.

Figures 1, 11:
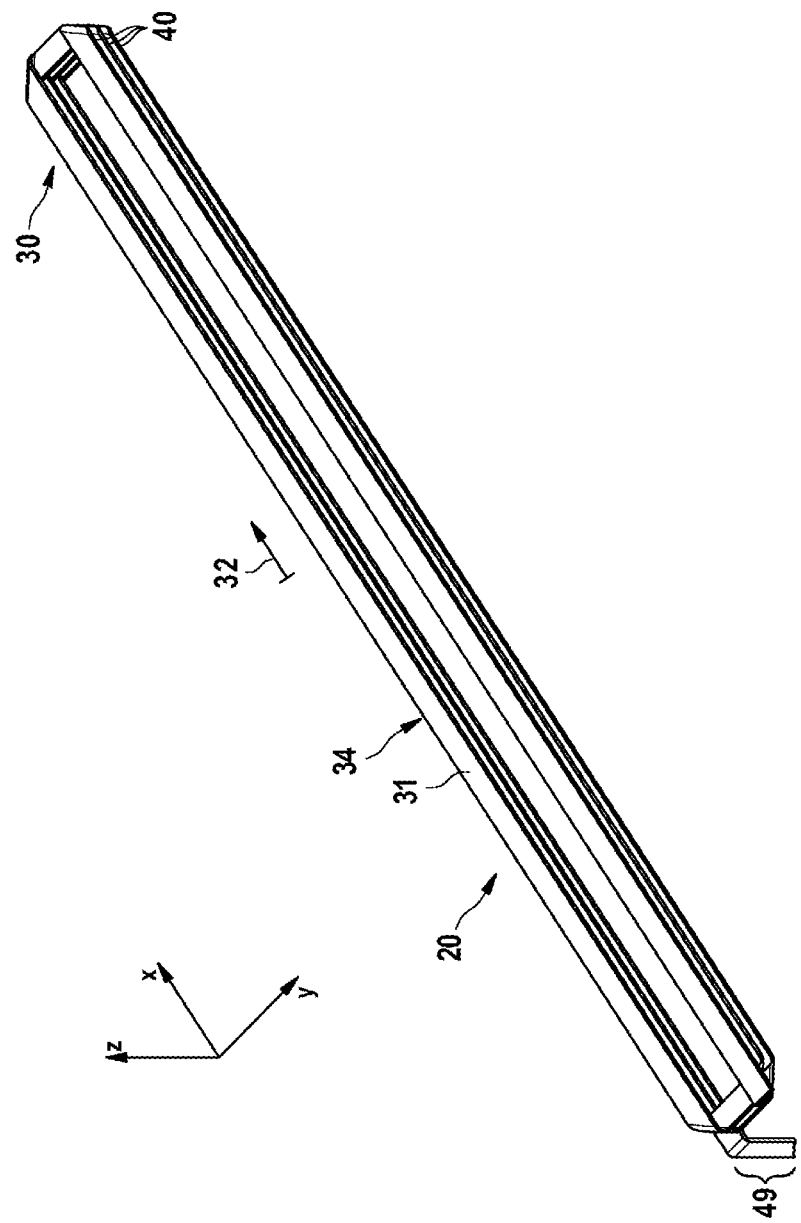
Figures 2, 11:
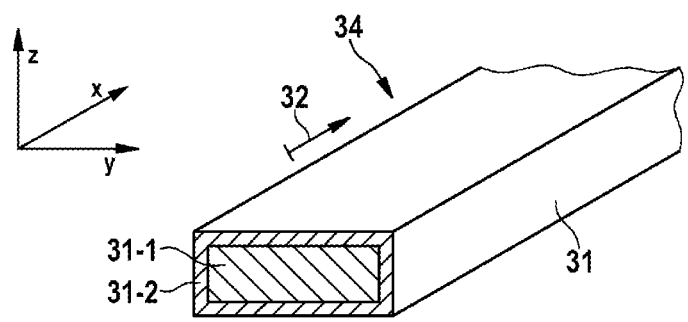

A coil arrangement 10 according to the invention may, in a coil 20, have not only one turn in the respective winding 30. In FIG. 11-1, a coil 20 of the coil arrangement 10 whose winding 30 has three turns 40 is illustrated in a perspective view from above.

Said coil 20 has a substantially planar form. The first and second linear sections 41 and 42 of a respective turn 40 of the winding 30 are in each case oriented parallel to one another. The same applies to the respective connecting pieces 44 between the first and second linear sections 41, 42 and also to the transition sections 47 between the respective turns 40 of the winding 30 of the coil 20.

The first and second linear sections 41 and 42 lie above the connecting piece 44. This is necessary for the nesting as per FIG. 14.

In the embodiment as per FIG. 11-1, in the region of the second ends 41-2, 42-2, the free end of the strip 34 has been correspondingly cut to length, projects perpendicularly out of the xy plane in which the coil arrangement 10 with the turns 40 of the winding 30 is substantially oriented, runs downward counter to the z direction, and forms for example a terminal section 49.

In other embodiments, the terminal section 49 may also be led in the z direction vertically upward or else counter to the x or y direction and laterally outward. However, the arrangement as per FIG. 11-1 yields a particularly compact construction.

FIG. 11-2 shows the abovementioned rectangular cross section of the winding material 31 of the strip 34, which forms the basis for the winding 30 of the coil 20 of the coil arrangement 10. As per the illustration of FIG. 11-2, the winding material 31 is formed from a conductive component 31-1, which forms the core of the winding material 31. The core with the conductive component 31-1 is surrounded by an insulation material 31-2. The strip extends overall in the strip extent direction 32, which in FIG. 11-2 coincides with the x direction.

The insulation material 31-2 may be an additionally applied coating, for example in the form of a lacquer or oxide. It is however preferable for the insulation material 31-2 to be obtained in particular inherently from the conductive component 31-1. This may for example be a native oxide, such as is present in the case of aluminum. It may however also be an artificially generated conversion material, for example an additionally strengthened embodiment of a natively formed oxide of the conductive component 31-1.

In addition to the electrical insulation, good thermal conductivity for the material is preferred.

FIGS. 12 to 16 show various details of embodiments of the coil arrangement 10 according to the invention with a multiplicity of turns 40 in each winding 30 of each coil 20 in a perspective side view.

Here, each turn 40 of a winding 30 is formed by a single strip 34 of a winding material 31. Each turn 40 has two, first and second linear sections 41 and 42 which extend in elongate fashion in the strip extent direction 32, in this case parallel to the x direction. The linear sections 41, 42 have, at their first ends 41-1 and 42-1 respectively, first and second folds 45 and 46, which are connected by a connecting piece 44. In this way, the extent of the respective turn 40 is diverted through 180°, such that the coil 20 forms a winding 30 which runs in altogether spiral-shaped fashion, with a multiplicity of turns 40.

Figure 12:
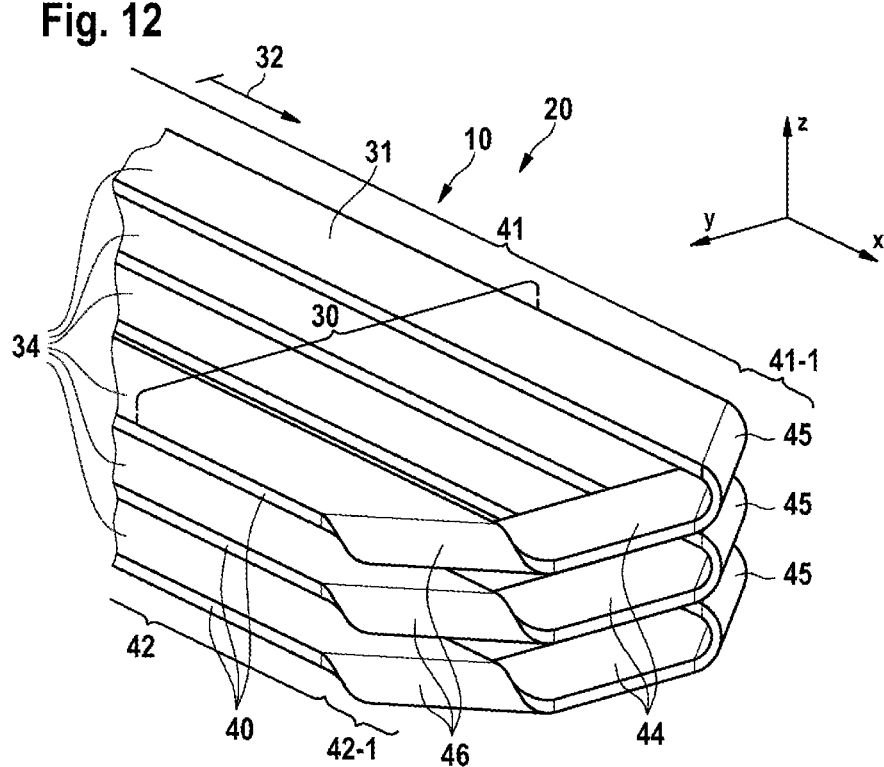
FIG. 12 shows a coil arrangement produced according to the invention, having a coil with multiple turns in the underlying winding.

In the embodiment of FIG. 12, the winding 30 is formed by three turns 40.

Figure 13:
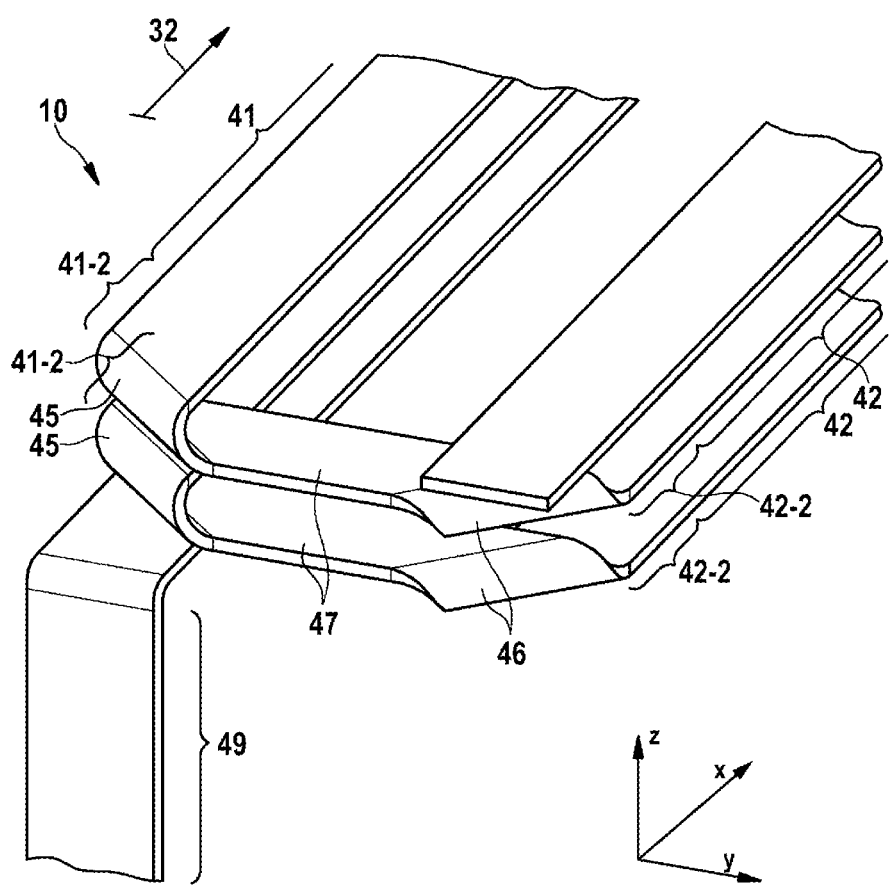
FIGS. 13 to 26 show views of another coil arrangement produced according to the invention, and of the details thereof.

In the embodiment of FIG. 13, two turns 40 are provided in the strip extent direction 32 in the winding 30. The view shows the second ends 41-2 and 42-2 of the first and second linear sections 41, 42, which are each formed with first and second folds 45 and 46 with a transition section 47 between successive turns 40 of the winding 30. The free end of the coil 20 of the coil arrangement 10 again forms a terminal section 49.

Figure 14:
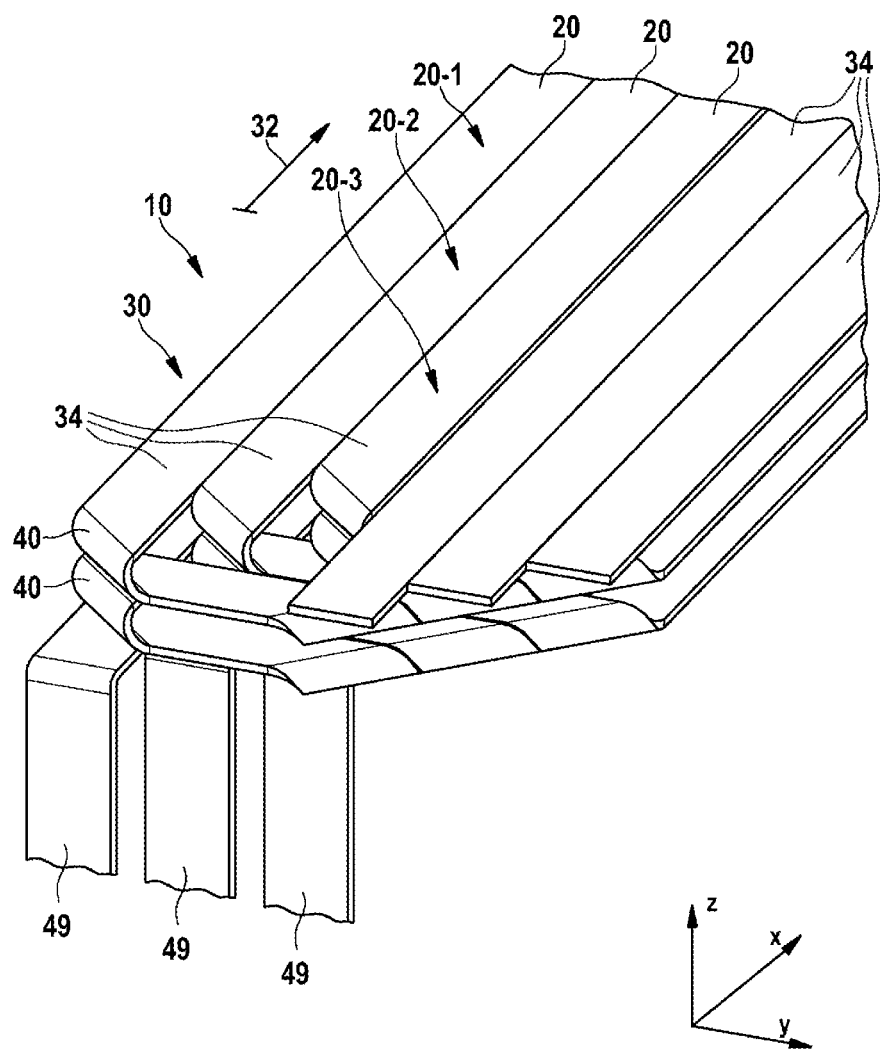

The coil arrangement 10 as per FIG. 14 comprises three individual coils 20 denoted by 20-1, 20-2, 20-3, specifically for independent phases of an electrical exciter current, which phases are fed in via mutually independent terminal sections 49 during operation. The individual coils 20 themselves extend in the strip extent direction 32 parallel to the x direction, but are arranged so as to be nested and/or interlaced one inside the other in the transverse direction, which corresponds to the y direction, and are in this case denoted individually by the reference designations 20-1, 20-2 and 20-3 for the purposes of a clearer illustration. Depending on the number of phases of a multi-phase exciter current, corresponding numbers of coils 20-1, 20-2, . . . must be provided in order, by means of the spatial arrangement with respect to one another, to form a spatial and temporal relationship of the magnetic fields to be generated which is necessary for the drive 100.

Figure 15:
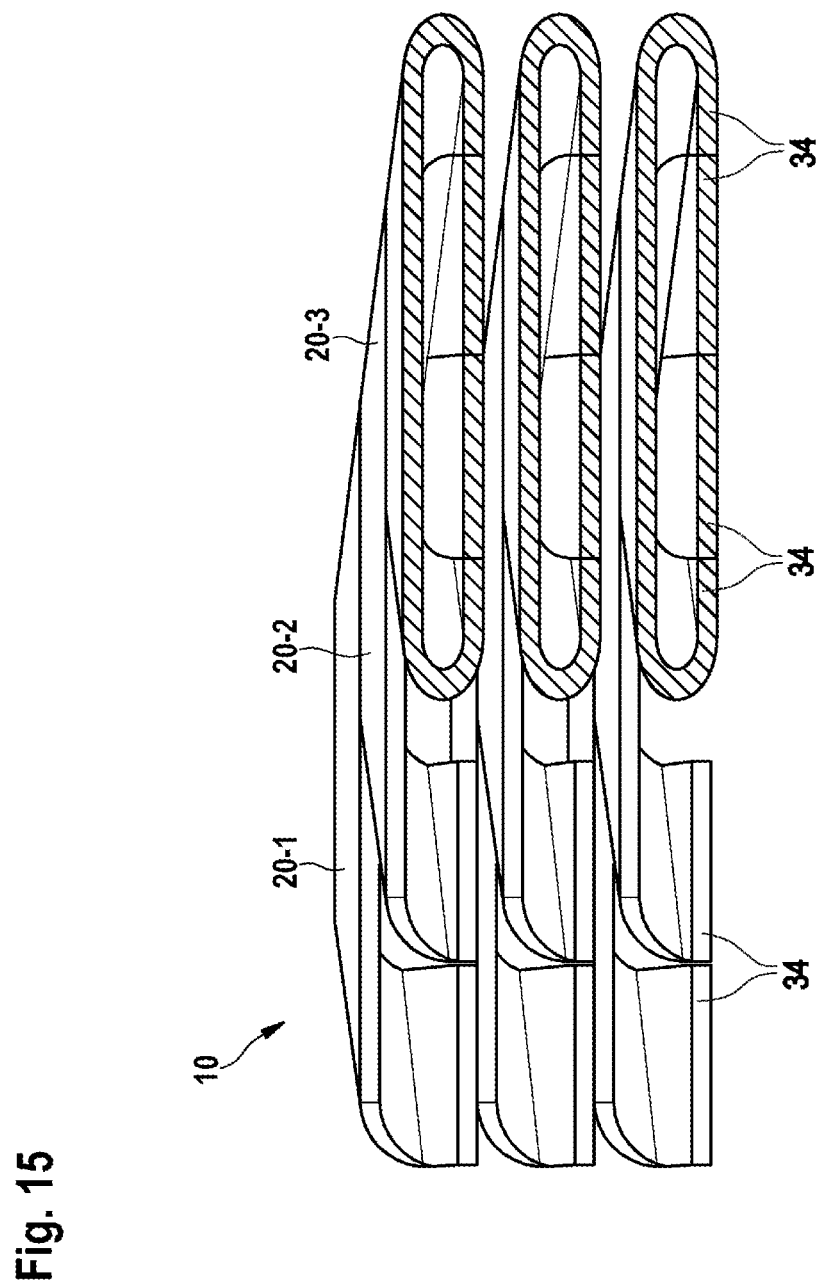

FIG. 15 shows a schematic side view of the coil arrangement 10 according to the invention from FIG. 14. From this illustration, it is clear that the individual coils 20 denoted by 20-1, 20-2, 20-3 of the coil arrangement 10 are arranged with their windings 30 composed of individual turns 40 nested one inside the other.

Figure 16:
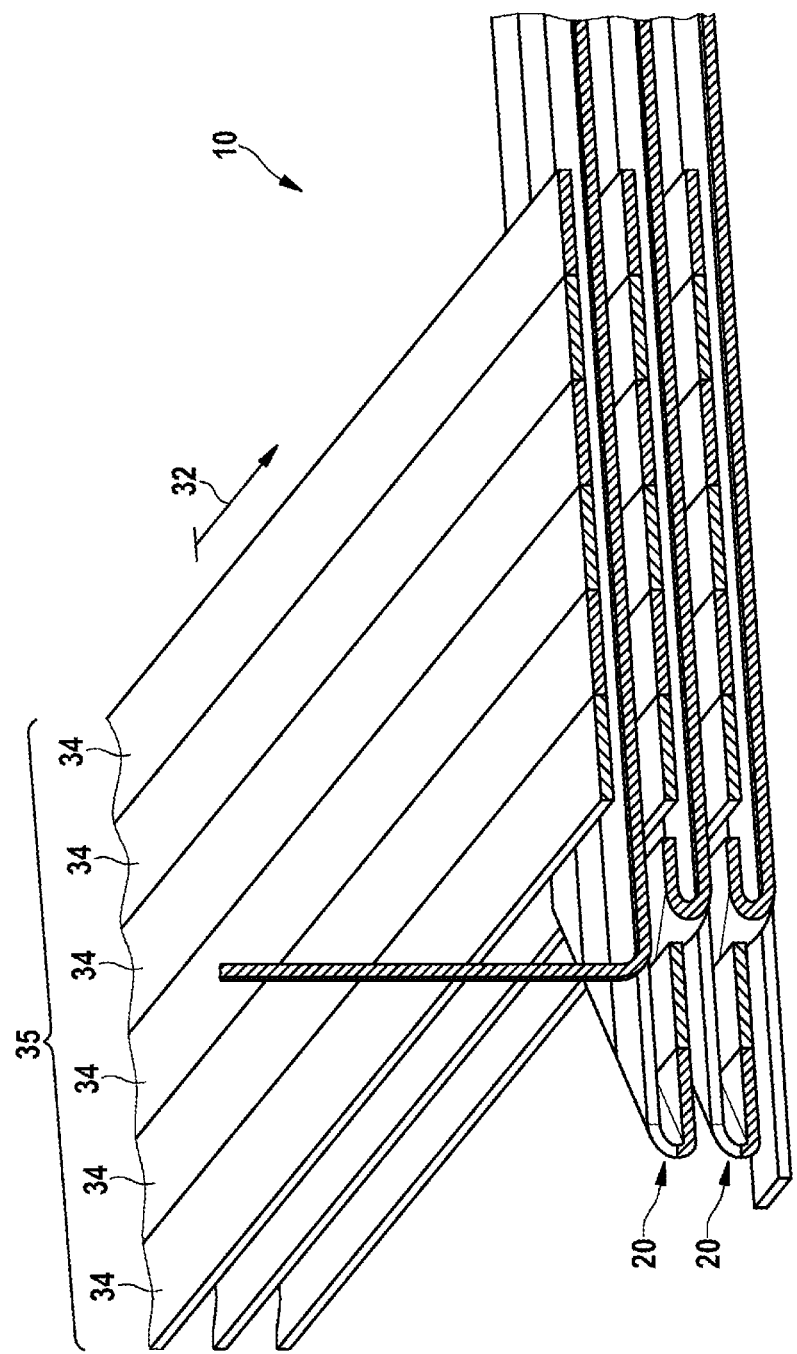

FIG. 16 illustrates in detail how the foil strips 34 as constituent parts of a superordinate and coherent foil 35 can be advantageously used in the production and arrangement according to the invention of a coil arrangement 100 according to the invention with a multiplicity of coils 20.

The strips 34 of the foil 35 are arranged directly adjacent to one another and perpendicular to the extent direction 32 of the individual strips and are electrically insulated with respect to one another. The insulation is realized for example through the provision of a fully oxidized separating region between mutually directly adjacent foil strips 34 of the foil 35.

Figure 17:
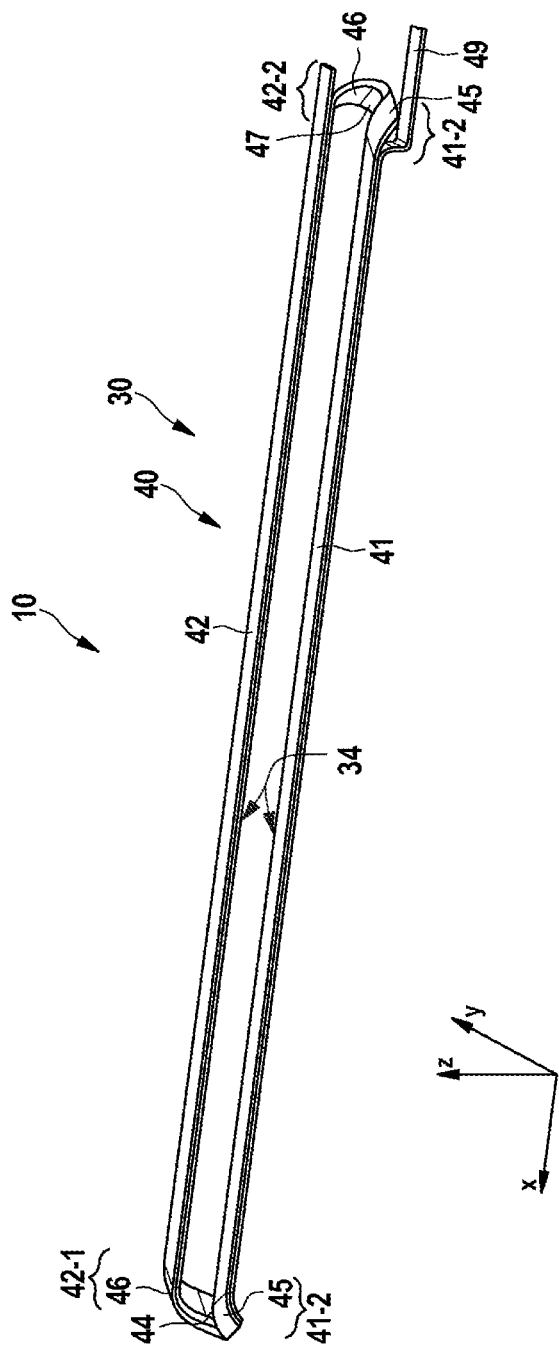

FIG. 17 shows another embodiment of the coil arrangement 10 according to the invention in which first and second ends 41-1, 41-2; 42-1, 42-2 of the linear sections 41 and 42 of a turn 40 of the winding 30 of the coil 20 project out of the plane, in this case the xy plane of the coil 20, through corresponding configuration of the first and second folds 45 and 46, and are angled counter to the z direction, such that the connecting pieces 44 and the transition sections 47 point out of the xy plane downward and thus counter to the z direction. The terminal section 49 is in this case led laterally outward parallel to the xy plane.

Figure 18:
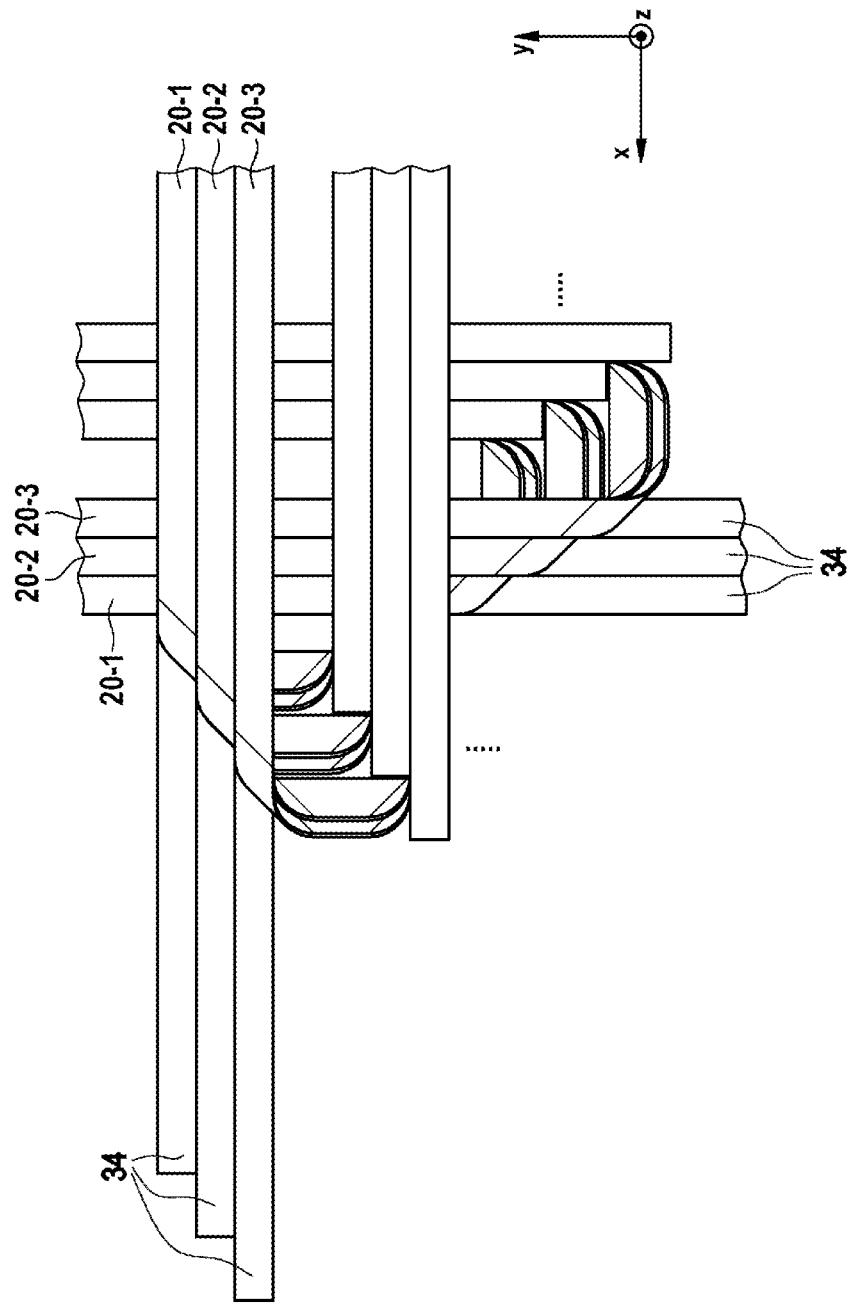
Figure 19:
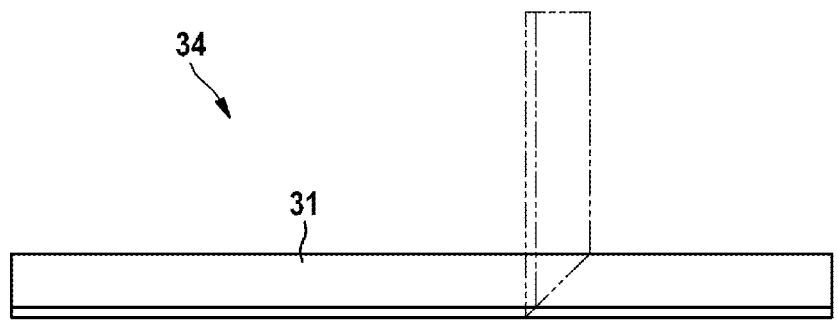
Figure 20:
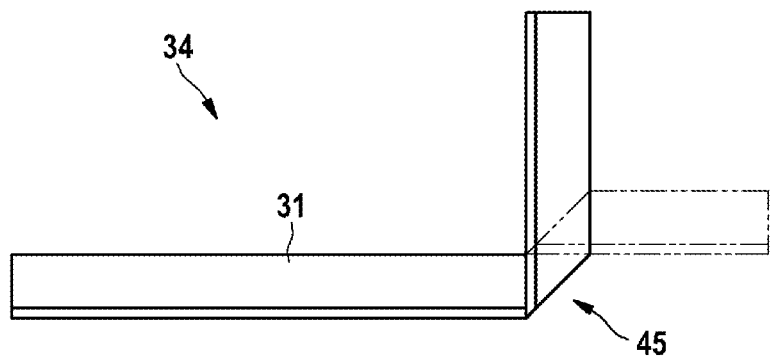
Figure 21:
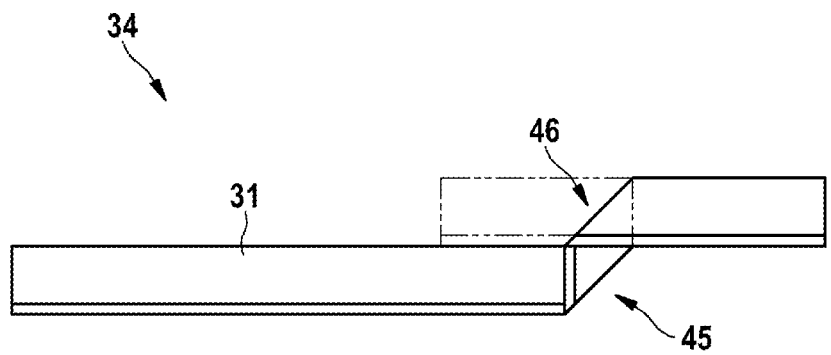
Figure 22:
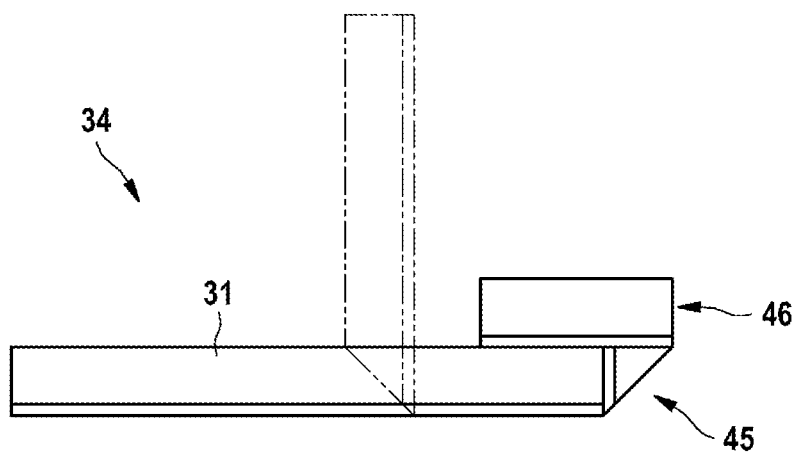
Figure 23:
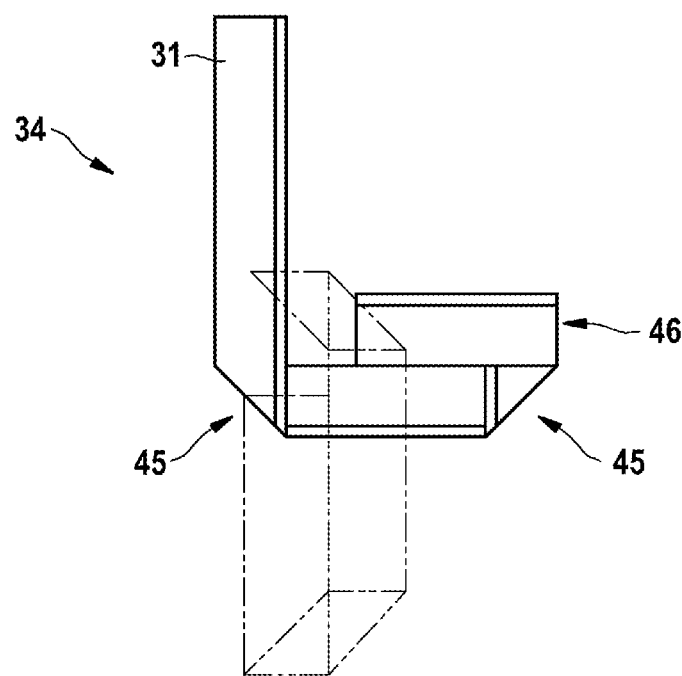
Figure 24:
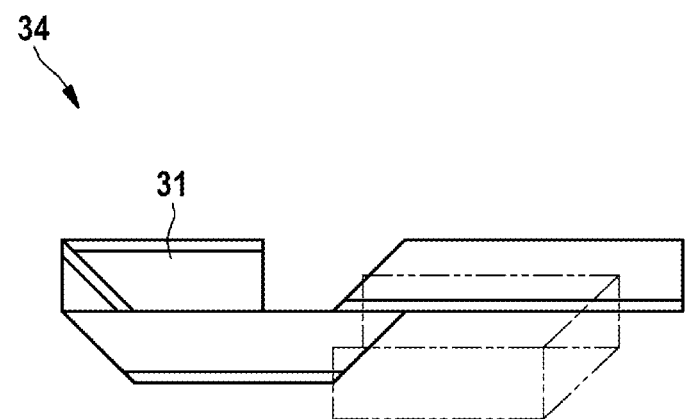
Figure 25:
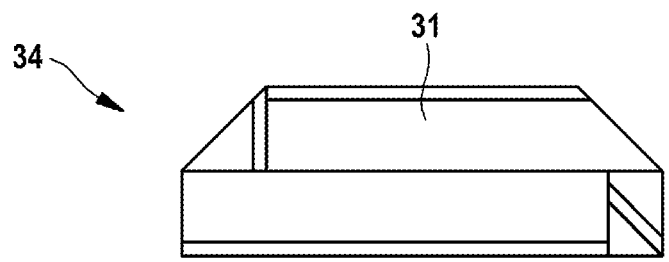
Figure 26:
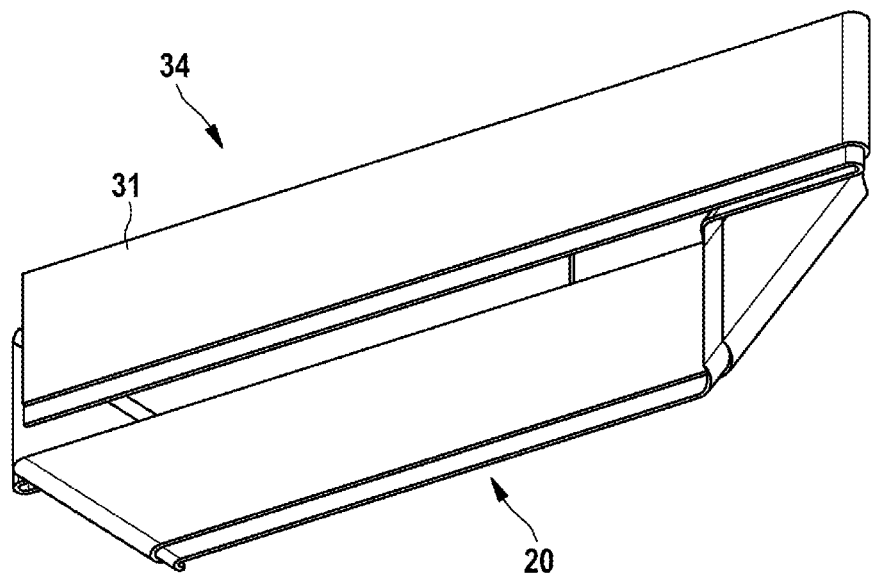

FIG. 18 shows a combination of multiple arrangements as illustrated in FIG. 17 so as to form a coil arrangement 10 which has three successive coils 20 in each case in the x direction and in the y direction, wherein, to form an overall stator 120, the sequence of the three coils 20-1, 20-2 and 20-3 is spatially repeated in the x direction and in the y direction for the various phases of the exciter current.

At this juncture, it is emphasized once again that the above-described perspective views of FIGS. 7 to 9 show various intermediate stages of a winding process based on a foil 35 with a multiplicity of foil strips 34 for forming a multiplicity of coils 20 in a coil arrangement 10 according to the invention.

FIG. 7 shows a coil arrangement 10, folded as a three-dimensional structure, with individual coils 20-1, 20-2 and 20-3.

FIG. 8 shows corresponding layers for coil arrangements 10 which are oriented in the x direction and in the y direction, wherein the two lower coil arrangements 10 extend in the x direction and the upper coil arrangement 10 extends in the y direction.

FIG. 9 shows a specific embodiment with coil arrangements 10 for the x direction and the y direction with regions, angled out of the xy plane, of the first and second ends 41-1, 41-2; 42-1, 42-2.

FIGS. 19 to 26 show, in schematic form, various possible configurations of the first and second folds 45 and 46 in conjunction with the first and second ends 41-1, 41-2; 42-1, 42-2 of the respective first and second linear sections 41 and 42 of the turns 40 of the windings 30 of the coil arrangements 10.

These and further features and characteristics of the present invention will be discussed in more detail on the basis of the following explanations:

For planar drives, magnetic fields are required which can be generated for example on the basis of the following approaches.

The present invention relates inter alia to the production of a flat coil arrangement 10 or coil 20 composed of structured foils, in particular foils with or composed of metal.

According to the invention, a coil arrangement 10 is produced as a product composed of a structured foil and in particular of a structured metal foil. A coil arrangement 10 of said type is designed to generate a periodic magnetic field, in particular with a maximum number of current loops both in the x direction and in the y direction.

The use of the product preferably yields the following function:

The coil arrangement 10 produced according to the invention is composed of lines or turns 40 which carry a three-phase current. By means of the production method, the structure of the coil arrangement 10 is formed such that, after three successive turns—1, 2, 3 with an electrical angle difference of in each case 60°—the first turn is led back in the opposite direction—that is to say in the direction −1—resulting again in an angle difference of 60° in relation to the turn 3. In this way, a periodic field build-up of the coil arrangement is generated, whereby a full period with 360° is realized with six lines, tracks or turns.

The idea of the production method according to the invention is based on the concept of using a—in particular structured—foil, that is to say an elastic material formed in a structured manner from a conductive material, and folding this to form a structure of a coil arrangement.

With such an approach, it is possible, in terms of a method, for the following aspects to be addressed and for the problems described below to be solved:

(1) Reconnection region or reconnection area: In this context, it is desirable that a multiplicity of units of the coil arrangement 10 can be formed in a two-dimensional arrangement with the smallest possible number and the smallest possible fraction of so-called dead areas or dead regions between the individual coil arrangements.

Solutions based on a PCB structure require a certain region or a certain area in order to form all connections between the lines or turns of the coil arrangement. In this way, the space that can be utilized for the active region is restricted, because placement below the PCB substrate is not possible.

(2) Conductor-to-insulator ratio, and total height of the arrangement: Since the magnetic field declines rapidly with distance, it is desirable for a major part of the arrangement to be configured with a minimal height. In the case of a PCB substrate, however, a minimum layer thickness of the insulator/substrate layers is predefined. As a result, the material fill factor decreases with the number of layers, because in each case one insulator foil with the same layer thickness must be used.

(3) Complexity of the arrangement: The above-described possible solutions, specifically the formation of a coil 20 from a flat wire and the formation of coils on the basis of circular wires, have a relatively complex structure for the coil arrangements 10 to be produced.

This arises on the basis of the following considerations:
Both measures require the use of complex tools and other handling appliances in order to maintain the shape of the coil arrangements to be formed during the individual production steps.

In the case of flat wires or lines being used, there is the problem that these are not standard wires, and it is also not possible to resort to automatable standard processes.

In the case of circular wires being used for forming coil arrangements, difficulties arise if material fill factors above 70% are sought. The theoretical limit is approximately 78% for so-called X-Y-X-Y shifting layers and 90% for so-called X-X-X-X configurations, if deformations are disregarded.

The associated problems are avoided in the case of the production method according to the invention by virtue of flat coils being formed on the basis of structured metal foils or similar structures.

In the discussion of the core aspects and of the advantages of the present invention in relation to existing concepts, the following must also be considered:

Another core aspect of the present invention is the electrical separation of the turns, tracks or lines (traces) in combination with the maintenance of the overall shape and of the mechanical integrity of the underlying foils. This makes it possible to replace separate manipulations relating to each individual wire, such as would conventionally have to be implemented by performing handling with a high degree of mobility during the arrangement and placement of the individual wires, turns or lines. The conventional approach can be replaced by simple folding of the layers of a foil, whereby the handling complexity and the complexity of the structure are reduced in relation to conventional approaches.

The problem relating to the conductor-to-insulator ratio and relating to the overall height of the arrangement is also solved by means of the production method according to the invention, that is to say through the use of a structured foil with corresponding lines contained therein. The theoretically attainable fill factor is unlimited, and amounts to almost 100%. With a sufficiently thin foil, the number of current loops can also be increased, for example with up to 30 loops in each direction in the case of a foil of 50 μm in thickness and with an overall thickness of 6 mm for a coil arrangement to be produced.

The problem relating to the recontacting regions or areas is also avoided through the possibility of folding or bending the recontacting regions under the respectively active region of a coil, as shown in conjunction with FIG. 1 (recreate FIG. 1 from the English-language invention record!). In relation to the effort and costs for such a structuring process, advantages are obtained, in particular in the assembly of the coil arrangement as a whole.

The following aspects must be taken into consideration with regard to the structure and function:

With regard to the function, it is possible with the production method according to the invention based on a foil to form turns or windings for conducting a three-phase current. The structure of the coil arrangement is selected such that, after three successive turns—1, 2, 3 with an electrical angle difference of in each case 60°—the first wire is led back in the opposite direction (the direction 1-) —and thus again has a 60° difference in relation to the wire 3 or the line 3. A periodic structure of the magnetic field to be generated is thus ensured. The coil arrangement is used to move a system, using electrical currents, in the X direction and the Y direction, specifically in a fully independent manner, specifically through interaction with permanent magnets, for example in the manner of a Halbach configuration.

The method-related solution according to the invention is based inter alia on the following aspects:

The table 1 presented below schematically shows the cross section of a coil arrangement produced according to the invention. The Y layers have exactly the same structure but are rotated through 90° relative to the X layers. The structure described below has the length of one complete magnetic period for a Halbach arrangement and the coils. The actual arrangement will generally have a length of multiple magnetic periods.

TABLE 1

| 1 | 2 | 3 | | next coil | |
|---|---|---|---|---|---|
| | | Y layer/plane | | | |
| | non-connected region | | 1- | 2- | 3- |
| | | Y layer/plane | | | |
| 1 | 2 | 3 | | next coil | |
| | | Y layer/plane | | | |
| | non-connected region | | 1- | 2- | 3- |
| | | Y layer/plane | | | |

With regard to the electrical power, the coil sets as per table 1 cannot be controlled independently of one another, because their turns interfere with one another.

Table 1 thus shows a possibility for the arrangement of the coils within a coil arrangement using a structured foil as illustrated in FIG. 3.

With regard to an alternative or additional solution, the following aspects must be taken into consideration:

Compared with the solution described immediately above, the layers of each coil occupy and utilize the complete layer. This increases the degree of utilization of the available space. This may be realized in particular by virtue of the coil being folded through more than 180°.

The coil sets can be actuated independently of one another.

Table 2 below shows another embodiment that can advantageously be produced with the method according to the invention, wherein the advantage is obtained that in each case the same coil lies in the same plane.

TABLE 2

| 1.1 | 1.2 | 1.3 | 1.1- | 1.2- | 1.3- | 2.1 | 2.2 |
|---|---|---|---|---|---|---|---|
| | | | Y layer/plane | | | | |
| 1.1 | 1.2 | 1.3 | 1.1- | 1.2- | 1.3- | 2.1 | 2.2 |
| | | | Y layer/plane | | | | |
| 1.1 | 1.2 | 1.3 | 1.1- | 1.2- | 1.3- | 2.1 | 2.2 |
| | | | Y layer/plane | | | | |

The coils must have a maximum material fill factor in order to maximize the conductivity. In this way, ohmic losses are reduced. The material fill factors also assist the heat dissipation, resulting in a further advantage of the design that can be produced according to the invention.

With regard to the structure, the following must be observed:

Firstly, the lines or tracks are produced on a metal foil, wherein it is necessary to prevent current from being conducted from track to track, because each track or each line is assigned to a separate coil—A, B, and C in FIG. 3.

To produce the lines or tracks of the foil or on the foil, different methods may be used.

In the case of aluminum foils, localized anodizing, possibly with local perforation, masking or local catalysis, is conceivable. Both for copper and for aluminum, there is the possibility of mechanical removal of the material between the lines or tracks and of performing filling with a bonding agent, for example with an adhesive or the like. As an alternative to this, use may also be made of other chemical and/or physical processes for modifying the characteristics of the original material.

After the structuring, the foil and/or the metal foil is folded. In each case two layers produce one coil turn with regard to each line or track, as illustrated in conjunction with the folded structure in FIG. 7. To produce an arrangement which has two coils in perpendicular directions, it is necessary, with regard to planar handling, for example by means of robots or the like, for foil layers or planes which are used in the x direction to alternate with planes or layers of the foil that are used in y directions. This is illustrated in conjunction with the overall structure in FIG. 8. As an alternative to the solution illustrated in the figures, it is also possible for a set of three coil lines to be folded in exactly the same way as one, as illustrated in conjunction with FIG. 9. Compared with the embodiments described above, the lines or tracks are rectilinear. Even an arrangement, for example with a bonding agent, of three tracks or lines can be used and folded all at once.

It is possible in each case for a foil with the corresponding lines or tracks for the strip-like material to be easily structured, wherein a relatively complex folding process is then involved, or else for an underlying foil with a complex structure for the lines or tracks of the strip-like material to be formed, whereby, subsequently, the method for folding the foil in order to form the individual coils of the coil arrangement is simplified.

Figure 27:
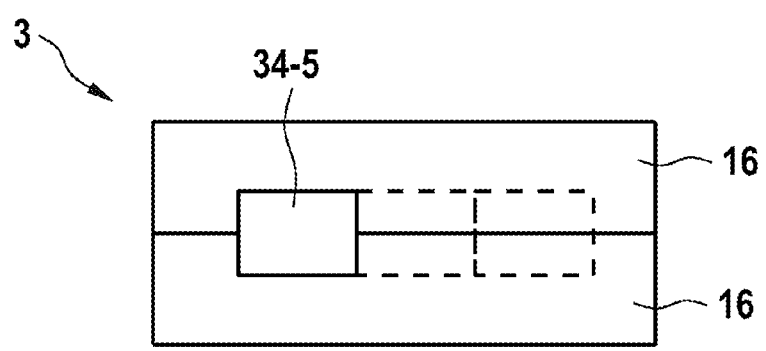
FIG. 27 is a schematic view of a main body of a coil arrangement according to a further exemplary embodiment of the invention.

FIG. 27 schematically shows a sectional view through a main body 3 of a coil arrangement as per a further exemplary embodiment of the invention. The main body 3 comprises a conductor track 34-5, wherein the conductor track 34-5 is introduced between two insulation elements 16. The insulation elements 16 are in particular foils which are cohesively connected to one another. In particular, it is provided that the insulation elements 16 together form the foil 35. The conductor track 34-5 is preferably punched out of a metal sheet by means of a punching process.

Figure 28:
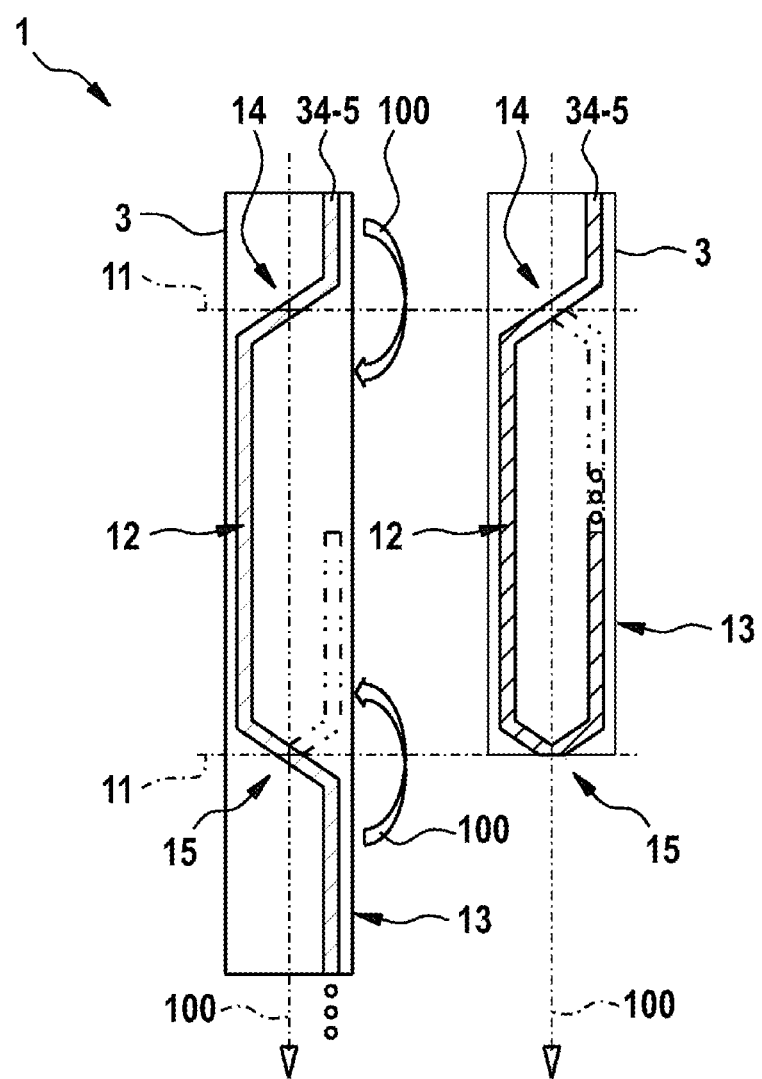
FIG. 28 is a schematic view of an unfolded and of a folded main body of a coil arrangement according to the further exemplary embodiment of the invention.

FIG. 28 shows a coil arrangement 10 according to a first exemplary embodiment of the invention, wherein the coil arrangement 10 comprises the main body 3 as shown in FIG. 27. FIG. 28 illustrates a plan view of the main body 3 from FIG. 27.

The conductor track 34-5 within the main body 3 is preferably formed so as to have a multiplicity of longitudinal sections 12, 13 and a multiplicity of transverse sections 14, 15. FIG. 28 shows, by way of example, a first longitudinal section 12, a second longitudinal section 13, a first transverse section 14 and a second transverse section 15. The main body 3 with the conductor track 34-5 is folded at a fold point 11. In terms of its function, the fold point corresponds in particular to the fold points 51 described above. Coils can be produced by means of the folding. Accordingly, by means of the folding at the fold points 11, the first longitudinal section 12, the second longitudinal section 13, the first transverse section 14 and the second transverse section 15 form a spiral-shaped body. In this way, a winding of a coil is realized. It can be seen that, by means of a main body 3 which comprises a multiplicity of longitudinal sections 12, 13 and transverse sections 14, 15 in the arrangement shown in FIG. 28, it is possible for a coil with any desired number of windings to be generated by means of a multiplicity of folds at respective fold points 11. By means of the insulation elements 16, a short circuit as a result of contact between the individual sections of the conductor track 34-5 is prevented from occurring.

It can be seen that the longitudinal sections, in particular the first longitudinal section 12 and the second longitudinal section 13, have a greater extent than the transverse sections 14, 15, in particular the first transverse section 14 and the second transverse section 15. It is also provided that the first longitudinal section 12 runs parallel to the second longitudinal section 13. It is particularly advantageously provided that all of the longitudinal sections 12, 13 of the conductor track 34-5 of the main body 3 run parallel to one another. The transverse sections 14, 15, in particular the first transverse section 14 and the second transverse section 15, run at an angle of between 0° and 90° relative to the longitudinal sections 12, 13. In FIG. 4, it is shown by way of example that the transverse sections 14, 15 have an angle of 45°. Each fold point 11 runs preferably perpendicular to all of the longitudinal sections 12, 13, and divides each transverse section 14, 15 in the middle. Thus, each transverse section 14, 15 transitions, by means of the folding at the fold point 11, into a curved shape. The winding head height, that is to say the height of the curve formed by the transverse sections 14, 15 after the folding above the longitudinal sections 12, 13, can thus be set by means of the angle at which the transverse sections 14, 15 run relative to the longitudinal sections 12, 13.

The main body 3 may preferably be prefabricated. After the prefabrication of the main body 3, the latter can be quickly and inexpensively formed into a coil by folding.

The conductor track 34-5 preferably strictly monotonously follows an extent direction 100. This means that the conductor track does not at any point run counter to the extent direction or perpendicular to the extent direction. It is thus ensured that no undesired overlaps are generated during the production of the coils by folding of the main body 3. The extent direction 100 is to be regarded in particular as an axis which runs centrally between the longitudinal sections 12, 13 and parallel to the longitudinal sections 12, 13. Thus, each fold point 11 is preferably defined as an axis which runs perpendicular to the extent direction 100 and through the point at which the axis of the extent direction 100 intersects the transverse sections 14, 15. This point of intersection thus constitutes a middle point of the transverse sections 14, 15.

Figure 29:
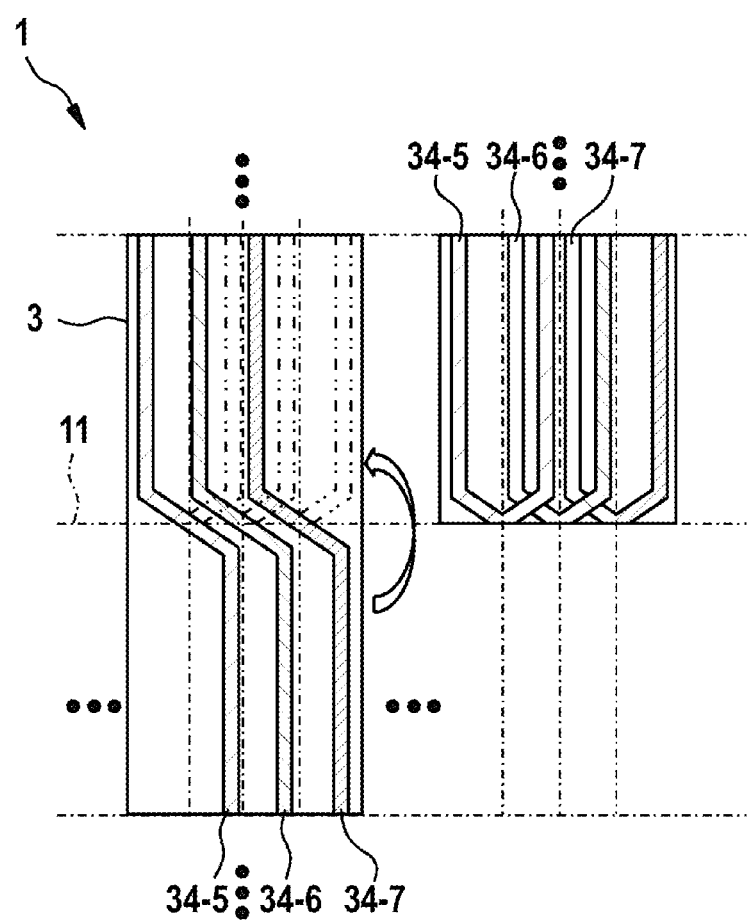
FIG. 29 shows a schematic view of an unfolded and of a folded main body of a coil arrangement according to a further alternative exemplary embodiment of the invention.

FIG. 29 shows a coil arrangement 10 according to an alternative further exemplary embodiment of the invention. In this regard, FIG. 5 in turn shows a main body 3 in an unfolded state and in a folded state. The only difference in relation to the first exemplary embodiment consists in that, instead of a single conductor track 34-5, a first conductor track 34-5, a second conductor track 34-6 and a third conductor track 34-7 are provided. Here, it is preferably provided that both the first conductor track 34-5 and the second conductor track 34-6 and the third conductor track 34-7 are all of identical design to one another. In particular, each of the conductor tracks 34-5, 34-6, 34-7 is of identical design to the conductor track 34-5 described in the above-described further exemplary embodiment. By means of the main body 3, in particular by means of the insulation elements 16, the first conductor track 34-5, the second conductor track 34-6 and the third conductor track 34-7 are configured so as to be spaced apart from one another, such that contact between the first conductor track 34-5, the second conductor track 34-6 and the third conductor track 34-7 is ruled out. In turn, a winding of a coil can be produced by folding at the fold point 11. Thus, FIG. 29 illustrates a three-phase system which can generate three independent windings simultaneously by folding of the main body 3 at the fold points 11.

Figure 30:
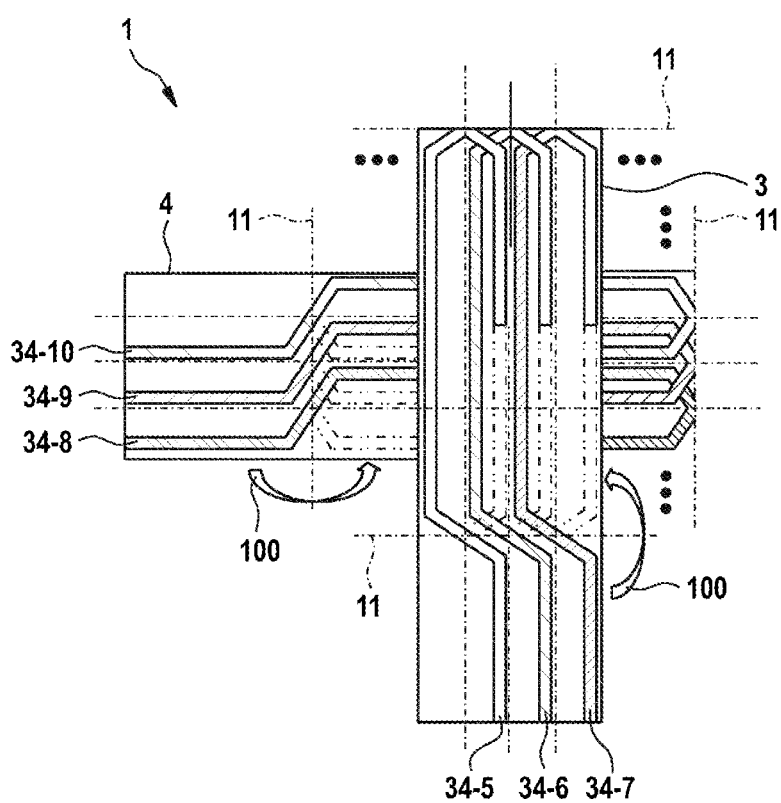
FIG. 30 shows a schematic view of two nested main bodies of the coil arrangement according to the further alternative exemplary embodiment of the invention.

FIG. 30 shows a coil arrangement 10 in which a first main body 3 and a second main body 4 are provided. It is provided that the first main body 3 and the second main body 4 are of identical form to the main body 3 shown in FIG. 30. It is provided here that the first main body 3 is arranged perpendicular to the second main body 4. This means that the longitudinal sections 12, 13 of all of the conductor tracks 34-5, 34-6, 34-7, 34-8, 34-9, 34-10 run perpendicular to one another. In this way, by means of the first conductor track 34-5, the second conductor track 34-6 and the third conductor track 34-7, a workpiece carrier 18 can be magnetically excited in a first spatial direction, whereas, by means of a fourth conductor track 34-8, a fifth conductor track 34-9 and a sixth conductor track 34-10, which are part of the second main body 4, the workpiece carrier 18 can be magnetically excited in a second spatial direction. The first spatial direction and the second spatial direction are in this case formed perpendicular to one another. By virtue of the first main body 3 and the second main body 4 being folded alternately at respective fold points 11, nesting of the first main body 3 and of the second main body 4 is made possible. This is schematically shown in FIG. 30.

Figure 31:
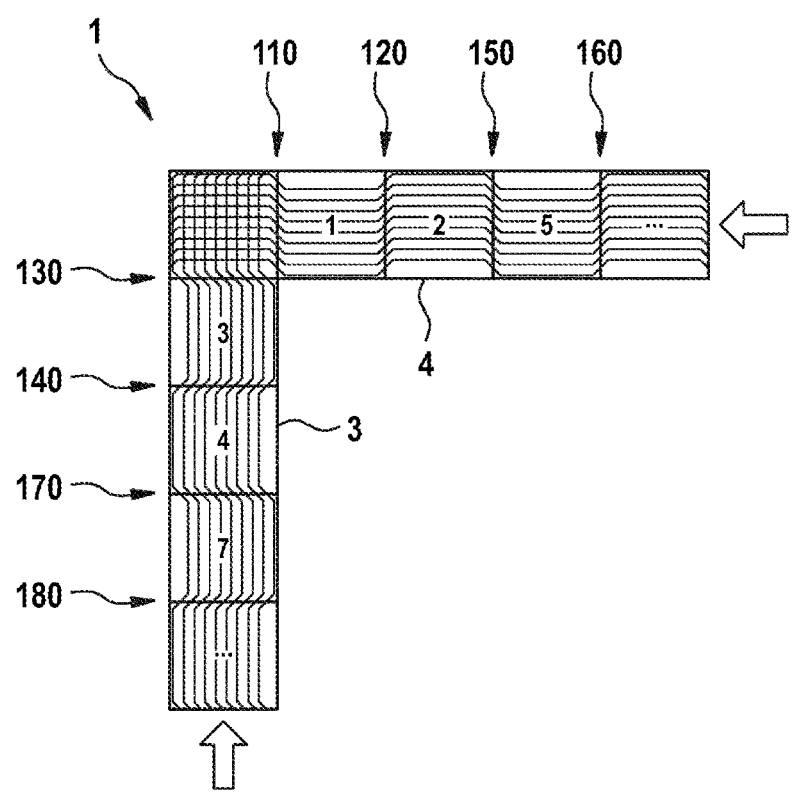
FIG. 31 shows a schematic view of a folding sequence of the main bodies of the coil arrangement according to the further alternative exemplary embodiment of the invention.

As can be seen from FIG. 31, the first main body 3 and the second main body 4 are laid one over the other. In particular, the first main body 3 is laid onto the second main body 4. Here, the first main body 3 and the second main body 4 run perpendicular to one another.

A first fold is subsequently performed at a first fold point 110 of the second main body 4. Thus, the second main body 4 overlaps the first main body 3. A second fold of the second main body 4 is subsequently performed at a second fold point 120. Thus, the second main body 4 has its original orientation again.

Subsequently, the first main body 3 is folded at a third fold point 130 and subsequently at a fourth fold point 140. Thus, the first main body 3 in turn overlaps the second main body 4. Finally, this is followed by a fifth folding of the second main body 4 at a fifth fold point 150 and a further folding at a sixth fold point 160. Thus, the second main body 4 is fully folded to form a coil. Finally, the first main body 3 is folded at a seventh fold point 170 and at an eighth fold point 180. Thus, the first main body 3 is also fully folded to form a coil. By means of the alternate folding, it is ensured here that the first main body 3 and the second main body 4 are nested one inside the other. This has the effect that the windings of the first main body 3 and of the second main body 4 are successively superposed. In this way, the winding pattern shown in FIG. 1 or FIG. 2 can be implemented easily and in an inexpensive manner.

The production of the conductor tracks 34-5, 34-6, 34-7, 34-8, 34-9, 34-10 is advantageously performed by punching, in particular by rotary punching or stroke-type punching. The punching-out is performed out of a raw material, which may in particular be a metal sheet. It is possible here for the entire structure to be produced from multiple parallel conductor tracks, such as in particular the first conductor track 34-5, the second conductor track 34-6 and the third conductor track 34-7, or the fourth conductor track 34-8, the fifth conductor track 34-9 and the sixth conductor track 34-10, and to be laminated in a continuous process sequence between the insulation elements 16. It is alternatively made possible for individual conductor tracks 34-5, 34-6, 34-7, 34-8, 34-9, 34-10 to be manufactured independently of one another and then wound onto individual rolls. In a subsequent process, said individual rolls may then be grouped together as desired in order to subsequently introduce the parallel conductor tracks 34-5, 34-6, 34-7, 34-8, 34-9, 34-10 between the insulation elements 16.

The insulation elements are advantageously a plastics foil. Electrical insulation foils as a subset of plastics foils may preferably be produced with a thickness proceeding from 2 μm, such that the coil produced by folding has only small dimensions.

The folds shown in FIG. 31 may be varied as desired. Accordingly, it is illustrated in FIG. 31 that the first main body 3 and the second main body 4 are folded twice before the respective other main body 3, 4 is folded. It is likewise possible for the first main body 3 to be folded once, before the second main body 4 is subsequently folded once. This single folding is repeated alternately for the first main body 3 and the second main body 4. It is also possible for three or more folds to be performed before alternating to the respective other main body.

The production method of the the laminated conductor structures main bodies 3, 4 can be freely scaled in terms of the planar dimensions and the cross section of the conductor tracks 34-5, 34-6, 34-7, 34-8, 34-9, 34-10. The separation of the conductor track production and of the lamination process from the actual winding or folding process of the planar winding permits inexpensive production and easy storage of the rolled-up or pre-folded conductor track carriers. The use of rectangular conductor track cross sections ensures a high conductor material fill factor of the planar winding.

Electrical insulation foils can be produced with a thickness proceeding from 2 μm; the required insulation characteristics can thus be adapted as required. The loss of fill factor resulting from the insulation material can also be minimized.

The laminate composed of insulation elements 16 and conductor tracks 34-5, 34-6, 34-7, 34-8, 34-9, 34-10 can then be wound onto a roll or deposited in pre-folded form as a pack with the dimensions of the coil arrangement. It is alternatively also possible for individual conductor tracks 34-5, 34-6, 34-7, 34-8, 34-9, 34-10 that have not yet been laminated to be manufactured and then initially wound onto individual rolls. In a subsequent process, these individual rolls can then be grouped together as desired in order to subsequently laminate the parallel conductor structures between insulation elements 16 (as carriers).

The invention claimed is:

1. A coil arrangement of a stator of a planar multi-dimensional drive, comprising:
   at least one coil including a winding,
   wherein:
   the winding is electrically conductive and has a winding material in a strip-like form in a strip extent direction;
   a first turn of the winding includes mutually parallel first and second linear sections, and a connecting section, the connecting section including a linear connecting piece, a first fold connecting the linear connecting piece to a first end of the first linear section, and a second fold connecting the linear connecting piece to a first end of the second linear section;
   the first and second folds each include a turnover of the strip-like winding material through 180° at an angle of 45° with respect to the strip extent direction; and
   an upper surface of the linear connecting piece faces a lower surface of the first linear section and a lower surface of the second linear section.

2. The coil arrangement as claimed in claim 1, wherein:
   the winding material is a conductor track of a foil including a plurality of the conductor tracks; and
   the plurality of conductor tracks is in the foil.

3. The coil arrangement as claimed in claim 2, further comprising:
   an electrical insulation arranged between directly adjacent conductor tracks of the plurality of conductor tracks in the foil,
   wherein the electrical insulation is formed (i) via local oxidation or anodizing, and/or (ii) via a local removal of material and refilling with material, such that the directly adjacent conductor tracks are thermally separated and at the same time mechanically constitute a unit.

4. The coil arrangement as claimed in claim 1, wherein:
the winding material forms a material core of the winding, and
the material core of the winding is, in the strip extent direction, at least partially covered by an insulation material.

5. The coil arrangement as claimed in claim 4, wherein the insulation material comprises a coating additionally applied to the winding material, the additionally applied coating comprising one or more of (i) a lacquer or oxide material, and (ii) a native and/or strengthened conversion coating in the form of an oxide layer of the electrically conductive component.

6. The coil arrangement as claimed in claim 1, further comprising:
a plurality of the coils,
wherein the windings of the plurality of coils are nested one inside the other.

7. The coil arrangement as claimed in claim 1, wherein:
the winding includes a second turn;
a transition section is arranged at a transition between the first and second turns, and the transition section is configured to connect a second end of the second linear section to a first end of a third linear section of the second turn;
the transition section includes a first transition fold in conjunction with the second end of the second linear section and a second transition fold in conjunction with the first end of the third linear section; and
the first and second transition folds are connected to one another by a linear transition connecting piece, and/or each of the folds has a transition turnover of the strip-like winding material through 180° at an angle of 45° with respect to the strip extent direction.

8. The coil arrangement as claimed in claim 7, further comprising:
ten additional turns.

9. The coil arrangement as claimed in claim 1, wherein the winding runs in a spiral fashion.

10. The coil arrangement as claimed in claim 1, wherein non-folded winding material extends monotonously along an extent direction.

11. The coil arrangement as claimed in claim 1, wherein the coil arrangement is configured to move a magnetic workpiece carrier, in freely floating fashion above the coil arrangement, in six independent degrees of freedom.

12. The coil arrangement as claimed in claim 1, wherein the winding material has a rectangular cross section perpendicular to the strip extent direction.

13. A method for producing a coil arrangement in a form of a flat coil and for a stator of a multi-dimensional planar drive, comprising:
forming at least one coil including an electrically conductive winding with or composed of a winding material; and
forming the winding as a structure, folded by folding at fold points, of the winding material such that an upper surface of a linear connecting piece connecting a first linear section to a second linear section of a first turn of the winding structure faces a lower surface of the first linear section and a lower surface of the second linear section.

* * * * *